US012311355B2

(12) United States Patent
Boardman et al.

(10) Patent No.: US 12,311,355 B2
(45) Date of Patent: May 27, 2025

(54) MODULAR SAMPLE PREPARATION DEVICES AND METHODS

(71) Applicant: Waters Technologies Corporation, Milford, MA (US)

(72) Inventors: Anna K. Boardman, Watertown, MA (US); Xiaoxiao Liu, Natick, MA (US); Micah Watt, Quincy, MA (US); Jonathan Belanger, Whitinsville, MA (US); Matthew A. Lauber, North Smithfield, RI (US); Michael Lavallee, Whitinsville, MA (US); Wenhao Zhu, Natick, MA (US)

(73) Assignee: Waters Technologies Corporation, Milford, MA (US)

( * ) Notice: Subject to any disclaimer, the term of this patent is extended or adjusted under 35 U.S.C. 154(b) by 611 days.

(21) Appl. No.: 17/166,051

(22) Filed: Feb. 3, 2021

(65) Prior Publication Data

US 2021/0245150 A1 Aug. 12, 2021

Related U.S. Application Data

(60) Provisional application No. 62/970,935, filed on Feb. 6, 2020.

(51) Int. Cl.
*B01L 3/00* (2006.01)
*B01L 3/02* (2006.01)

(52) U.S. Cl.
CPC ............. *B01L 3/502* (2013.01); *B01L 3/0275* (2013.01); *B01L 2200/028* (2013.01); *B01L 2200/12* (2013.01)

(58) Field of Classification Search
CPC .. B01L 3/502; B01L 3/0275; B01L 2200/028; B01L 2200/12; B01L 2200/0631; B01L 2300/0681
See application file for complete search history.

(56) References Cited

U.S. PATENT DOCUMENTS

2005/0019950 A1* 1/2005 Gierde .................. B01J 20/285 436/180
2017/0189899 A1* 7/2017 Gupta ...................... B01L 3/02

FOREIGN PATENT DOCUMENTS

EP 1882524 A1 1/2008
WO 2017116960 A2 7/2017

OTHER PUBLICATIONS

Invitation to Pay Additional Fees And, Where Applicable, Protest Fee issued in International Application No. PCT/IB2021/050875 dated Jun. 14, 2021.

* cited by examiner

*Primary Examiner* — Dennis White
(74) *Attorney, Agent, or Firm* — Womble Bond Dickinson (US) LLP; Deborah M. Vernon; Mark R. DeLuca

(57) ABSTRACT

The present technology relates to a customizable sample preparation device (e.g., liquid sample preparation device, such as a purification, clean-up, or separation device). In particular, the present technology relates to customizable devices formed from modular segments tailored to address one or more of the following: to optimize different sample and elution volumes, to incorporate various connection mechanisms to liquid handlers, to incorporate various liquid dispensing flow conditions, and to fulfill broad applications through the selection of specific resin for sample preparation. Some embodiments are directed to affinity capture devices, such as for example, Protein A affinity capture devices, utilizing a polymethacrylate-based resin. Other resins as well as other materials for processing a liquid sample are described herein.

7 Claims, 31 Drawing Sheets

MODULAR SAMPLE PREPARATION DEVICES AND METHODS

RELATED APPLICATION

This application claims priority to U.S. Provisional Patent Application 62/970,935, filed on Feb. 6, 2020, which is incorporated by reference in its entirety.

FIELD OF THE TECHNOLOGY

The present disclosure relates to sample preparation devices (e.g., liquid sample preparation devices such as purification, sample clean-up, separation, etc, devices). More specifically, the present disclosure relates to customizable devices formed from modular segments. The modular segments are tailored to address one or more of the following: to optimize different sample and elution volumes, to incorporate various connection mechanisms to liquid handlers and/or separation instruments, to incorporate various liquid dispensing flow conditions, and to fulfill broad applications through the selection of specific resin for sample preparation. In particular, devices and methods disclosed herein are amenable to both manual and automation platforms while offering high recovery, fast and simple operation and integration into liquid chromatography-based characterization and quantification assays.

BACKGROUND

Affinity capture is one of the most powerful techniques for facilitating protein purification, conducting analysis of biotherapeutics, and performing pre-clinical diagnostics. However, problems like tedious sample preparation steps, insufficient selectivity and recovery targets, poor reproducibility and unoptimized compatibility with upstream delivery of samples and downstream processing still plague assay development. For example, delays can arise not only from off-line sample preparation steps, but also from optimizing processing steps to comply with form factors of disposable lab-ware and integration with processing hardware.

Researchers analyzing both large and small molecule development candidates (e.g., biotherapeutics and endogenous proteins) require separation and purification devices capable of fast, simple and high recovery operation. Hundreds of thousands of samples may need to be processed and assays optimized from low throughput trials to high throughput development. These same problems are present for other sample preparation methods too (e.g., sample preparations using other types of resins such as, e.g., phospholipid removal, ion exchange, reversed phase, among many others). There is an unmet need to have these disposable tools seamlessly integrate into existing LC-based characterization and quantification assays. In addition, the lack of options with respect to liquid/sample delivery to the devices as well the lack of options with respect to sample type (e.g., sample volume, concentration, and elution needs) further slow researchers' efforts.

SUMMARY

Effective characterization of biotherapeutics is at the core of process development and optimization. Understanding glycosylation, deamidation, isomerization and aggregate formation is essential for optimization of yield and purity. Current analytical workflows are not compatible with bioreactor conditions and require optimized sample-clean up and pre-treatment. Development routinely moves from low throughput trials to high throughput development. Each of these stages is slowed or delayed due to lab-ware optimization steps.

For example, researchers must purify monoclonal antibody-based therapeutics from cell culture before downstream analysis. As a result, thousands of samples are generated to optimize process development conditions, all requiring purification. Due to differences in titer, sample volume, and sample loading device among others, various form factors of disposable lab-ware may be desired to eliminate constant optimization.

The present technology solves these problems by providing customizable purification or liquid sample processing devices. In particular, the technology provides modular components for two or more different segments of a processing device that can be integrated together to meet researchers' needs. In embodiments, the technology provides three modular components. In certain embodiments, the technology provides more than three modular components. While combinations of pipette tips and 96-well plates that contain sample preparation media have been previously described in the art as being a multi-part device for purification, these prior art devices are not modular. That is, these devices do not offer the ability to tailor or customize the type of purification or form factor by selecting an appropriately tailored segment or portion of the device. Using a modular approach, afforded by the present technology, allows for customization of each liquid preparation device for a selected sample load, sample purification, and downstream analysis. In general, in some embodiments, the present technology is a pipette tip-based apparatus composed of at least three modular parts: (1) a reservoir, (2) a body containing the selected resin, and (3) a tip for generating a desired droplet volume. Each of these three parts can be customized to, tailored to, or selected to perform well with the type of sample and/or desired sample processing and/or type of non-disposable liquid processing lab hardware (e.g., upstream liquid handling device, downstream analysis instruments). And, as a modular approach is utilized, an appropriate combination for the three or more modular parts can be selected to meet the particular needs dictated by the type of sample and purification/processing desired.

In one aspect, the technology relates to a method of forming a liquid sample processing device. The method includes at least three steps. In a first step a single tip portion is selected from a group of at least two different modular tip segments, wherein each of the at least two different modular tip segments has a same mating interface portion disposed on an inlet end. In a second step, a single reservoir portion is selected from a group of at least two different modular reservoir segments, wherein each of the at least two different modular reservoir segments has the same body interface portion disposed on an outlet end. Finally, in the third step, the selected single reservoir portion and the selected single tip portion are fluidly connected to a modular body portion. The modular body portion has a first end adapted to mate with the same mating body interface portion of the selected single reservoir portion and a second end adapted to mate with the same mating interface portion of the selected single tip portion.

In an aspect, the technology relates to a method of providing a bespoke liquid sample processing device. The method includes receiving a design specification for the bespoke liquid sample processing device. The design specification indicating the liquid manipulator interface type and at least one or more of the following features: a volume of sample, a sample receptacle type, a desired droplet shape; a desired outlet flow connector; separation media type; filtration component, and volume of wash. The method further includes selecting from a batch of reservoir portions of various configurations, a modular reservoir portion configured to meet at least one indication (e.g., feature or liquid manipulator interface type) of the design specification. The method also includes selecting from a batch of body portions of various configurations, a modular body portion configured to mate with the selected reservoir portion and for meeting at least one indication (e.g., feature) of the design specification and selecting from a batch of tip portions of various configurations, a modular tip portion configured for mating with the selected body portion and for meeting at least one of indication of the design specification. The method also includes securing the modular reservoir portion to the modular body portion and securing the modular body portion to the modular tip portion to create a fluid path extending through the secured modular reservoir portion, modular body portion, and modular tip portion.

The above aspects and features of the present technology include numerous advantages. For example, the present technology features a new processing device composed of two or more modular components (e.g., 2, 3, 4, 5, etc.). Each of these modules is tailored to handle or provide optimal results for different sample and elution volumes, to incorporate various adapter mechanisms, and to fulfill broad applications through the selection of specific resins. Compared to existing or conventional devices, the devices and methods described herein are amenable to both manual and automation platforms while offering high recovery, fast and simple operation, and seamless integration into liquid chromatography-based characterization and quantification assays. As a result, increased speed and efficiencies can be realized during assay development. In addition, assays can now be optimized and tailored easily to sample type, as well as desired lab hardware. Another advantage is the possibility of adoption of continuous manufacturing techniques for biotherapeutics as at-line analytical testing may be accomplished using the present technology.

BRIEF DESCRIPTION OF THE DRAWINGS

The technology will be more fully understood from the following detailed description taken in conjunction with the accompanying drawings, in which:

FIG. 8B is a perspective view and FIG. 8C provides a cross-sectional view.

FIG. 8D is a perspective view and FIG. 8E provides a cross-sectional view.

FIG. 8F is a perspective view and FIG. 8G provides a cross-sectional view.

DETAILED DESCRIPTION

Modular sample preparation devices of the present technology include pipette tip-based apparatus designed to have the flexibility and simplicity to address sample preparation needs quickly. The devices of the present technology include at least two customizable (or more, for example 3, 4, etc.) modular components. Each of these modules is tailored in manufacturing to optimize different sample and elution volumes, to incorporate various adapter mechanisms, and to fulfill broad applications through the selection of specific resins. Compared to existing state-of-the-art, the modular apparatus of the present technology is amenable to both manual and automation platforms while offering high recovery, fast and simple operation, and seamless integration into liquid chromatography-based characterization and quantification assays.

Biotherapeutic researchers typically purify monoclonal antibody-based therapeutics from cell culture before downstream analysis. Consequently, thousands of samples are generated to optimize process development conditions, all requiring purification. Due to differences in titer, sample volume, and sample load among others, having a range of devices that can be customizable to unique process flows will be beneficial for diverse requirements. Previous systems using pipette tips and 96-well plates including preparation media have been described as having multiple parts. While these prior devices contain multiple parts, they are not modular in assembly. Nor do these prior devices allow for customization to a different sample load, sample purification, and/or downstream analysis.

Figure 1A:
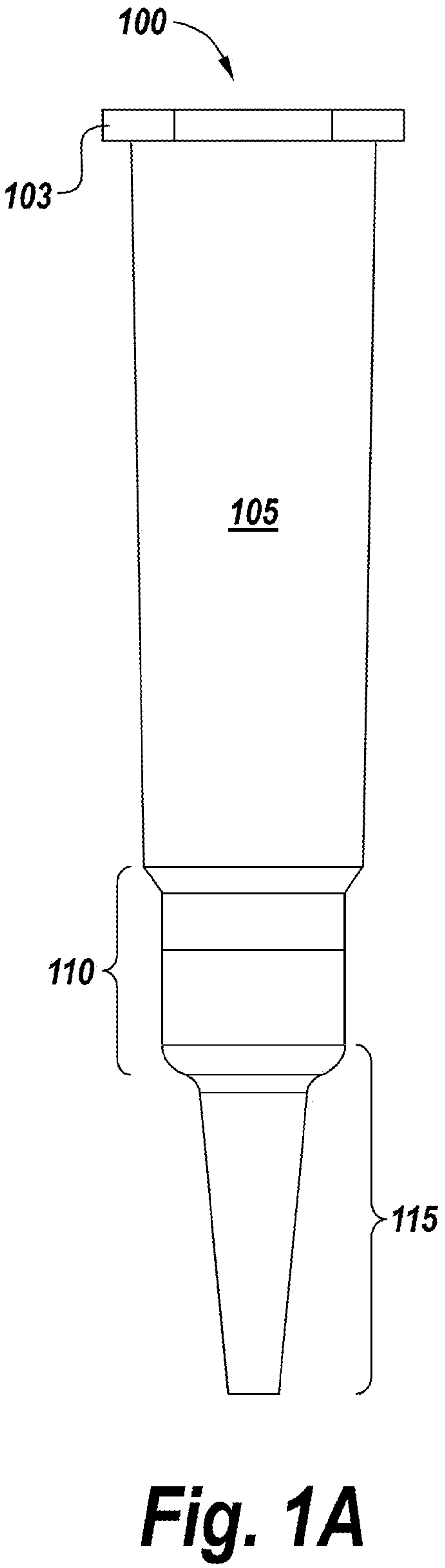
FIG. 1A shows a front view of an embodiment of a preparation device in accordance with the present technology in the assembled state.
Figure 1B:
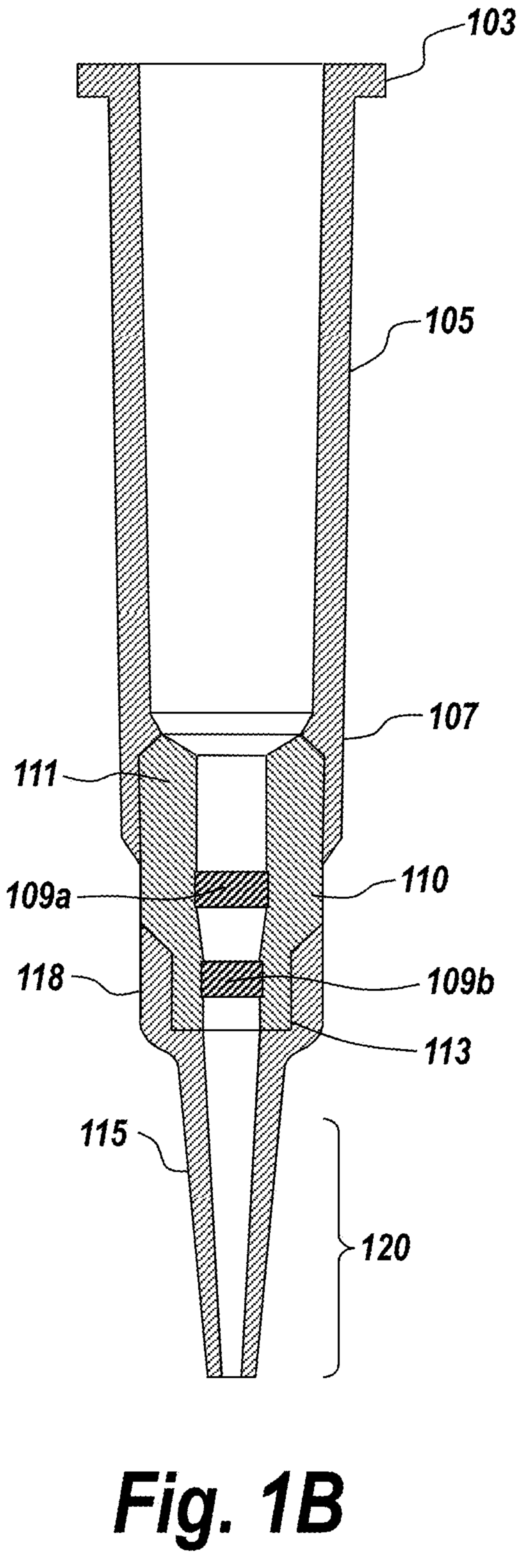
FIG. 1B shows a cross-sectional view of the preparation device of FIG. 1A.

In one embodiment, the present technology relates to a pipette tip-based device composed of three customizable, modular parts, including a reservoir portion, a body portion, and tip portion. For example, FIGS. 1A and 1B illustrate an embodiment of a device in accordance with the present technology. FIG. 1A shows a front view of device 100, whereas FIG. 1B provides a cross-sectional view of the device 100. The device 100, which can be used for sample preparation, includes a reservoir portion 105, a body portion 110, and a tip portion 115. When assembled, and as can be seen in cross-section, the body portion 110 is sandwiched between the reservoir portion 105 and the tip portion 115. In the embodiment shown in FIG. 1B, an end or outlet portion 107 of the reservoir portion 105 connects a top end 111 of fluid receiving end of the body portion 110 and an inlet portion 118 of the tip portion 115 accepts a bottom end 113 of the body portion 110. The body portion includes two retaining structures 109*a* and 109*b*, such as, for example frits or supporting membrane filters, securing a resin or other media for processing a liquid sample. An outlet portion 120 of the tip portion 115 is customized to generate a desired droplet volume and/or shape exiting the device 100.

Figure 1C:
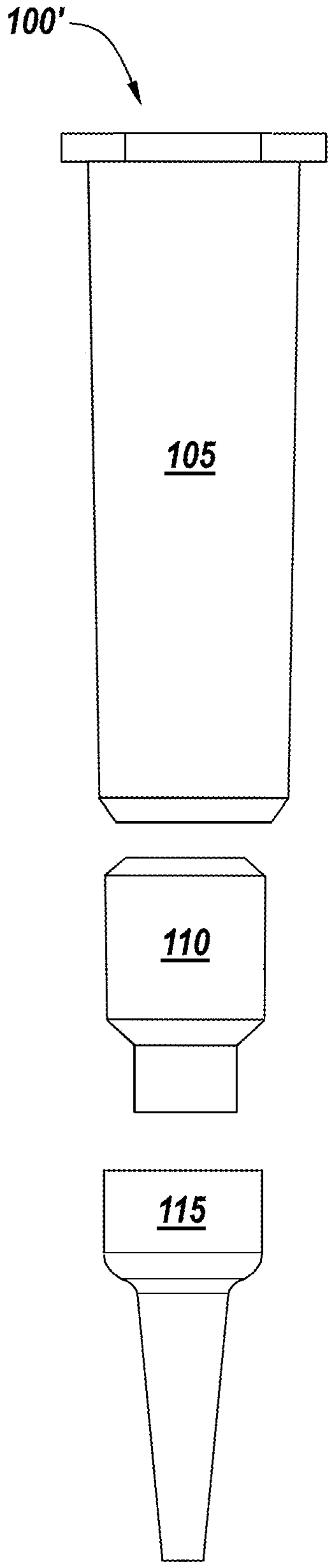
FIG. 1C shows an exploded view of the preparation device of FIG. 1A (e.g., in an aligned but not assembled state, having a reservoir segment, a body segment, and a tip segment).
Figure 1D:
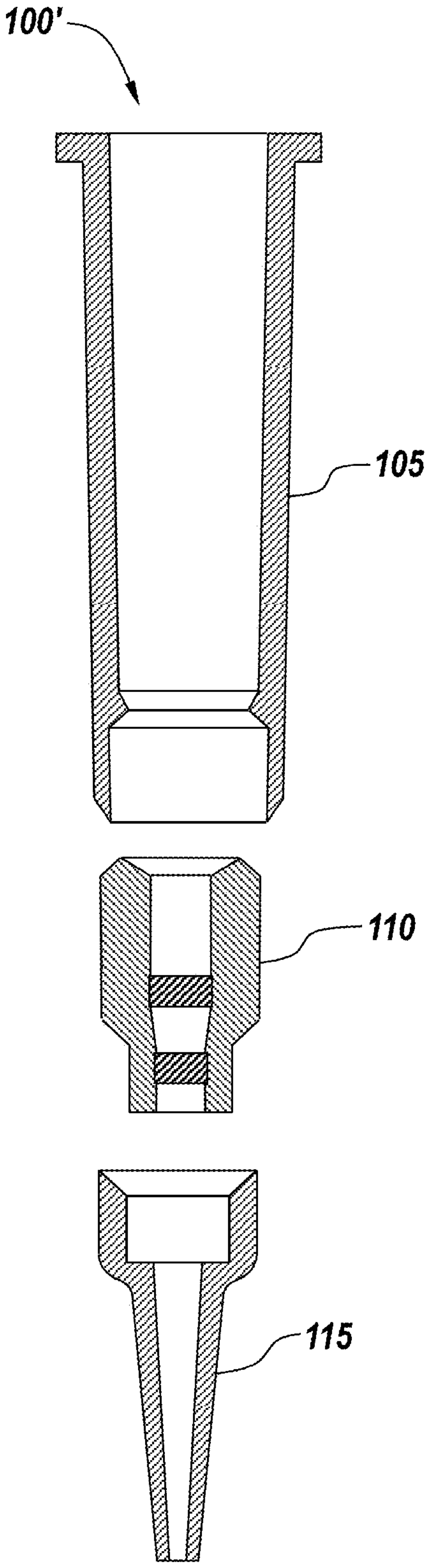
FIG. 1D shows a cross-sectional view of the device of FIG. 1C.

Referring to FIGS. 1C and 1D, device 100 is formed of three modular pieces. Each of the pieces can be customized for a particular sample or processing step. The customized modular pieces are then assembled to create the device 100. FIGS. 1C and 1D illustrate the device 100 in an unassembled state. That is, FIG. 1C illustrates device 100' in an exploded view wherein each modular component (i.e., reservoir portion 105, body portion 110, and tip portion 115) are aligned but not assembled (and thus not fluidly connected to process a liquid sample). FIG. 1D shows the non-assembled device 100' in a cross-sectional view.

Each of the modular portions (i.e., reservoir portion 105, body portion 110, and tip portion 115) are customizable. That is, in one embodiment, a number of different types of reservoir portions can be manufactured (e.g., three different types, four different types, five different types, etc.). A user can then select an appropriate reservoir type for the particular sample type and/or sample preparation or processing conditions to address their particular needs. For example, in an embodiment, where three different reservoir types are made a user selects the type most appropriate for their sample processing needs and as each of the reservoir portions are modular, is able to assemble a customized device using the selected reservoir portion type together with a selected body portion type and selected tip portion type.

Figure 1E:
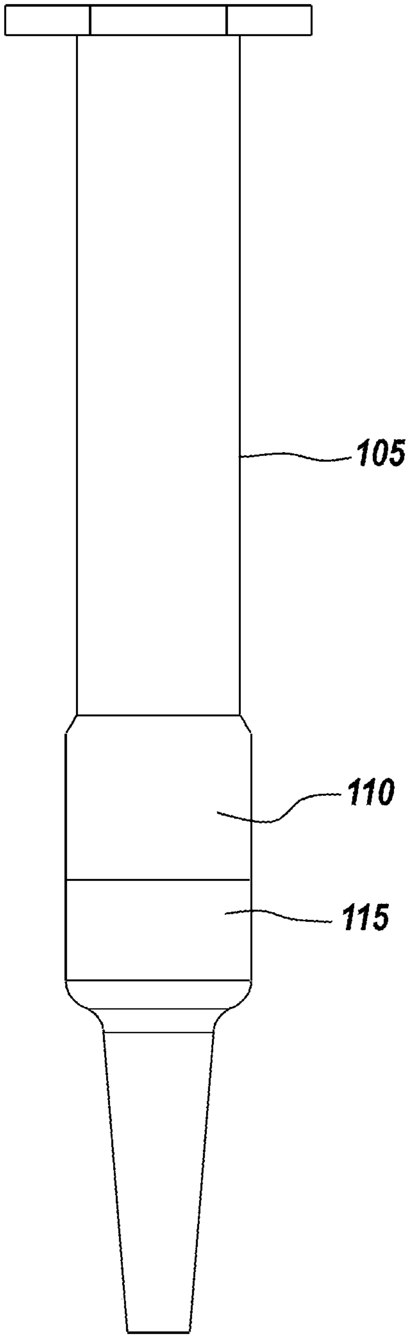
FIG. 1E shows a front view of another embodiment of a preparation device in accordance with the present technology.
Figure 1F:
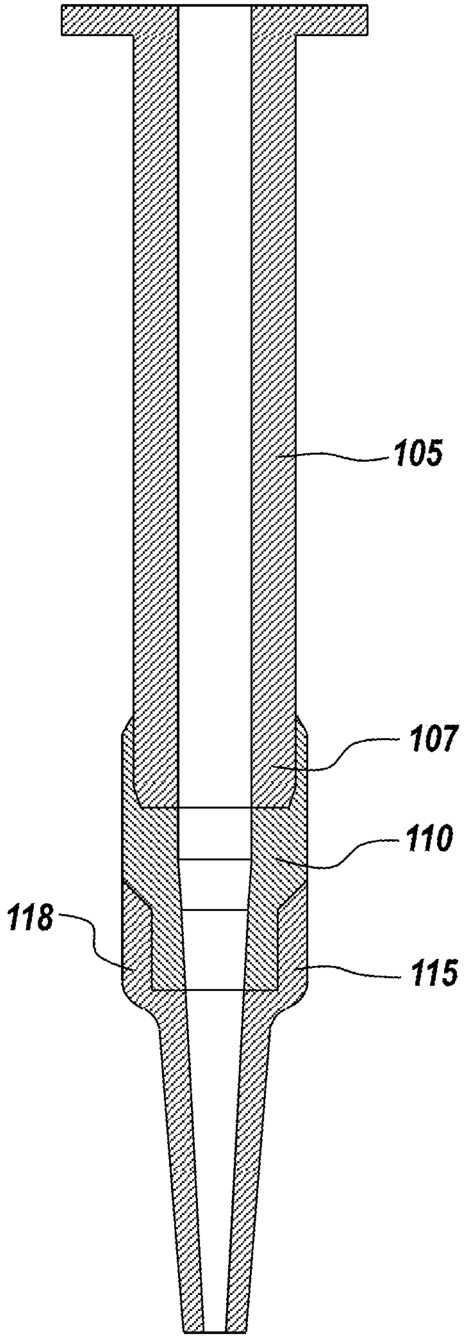
FIG. 1F shows a cross-sectional view of the embodiment shown in FIG. 1E.
Figure 1G:
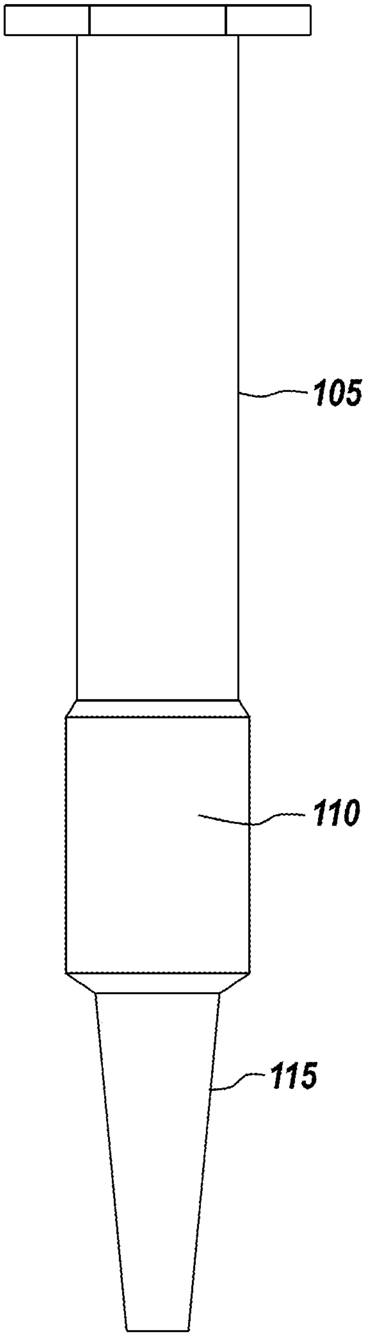
FIG. 1G shows a front view of another embodiment of a preparation device in accordance with the present technology.
Figure 1H:
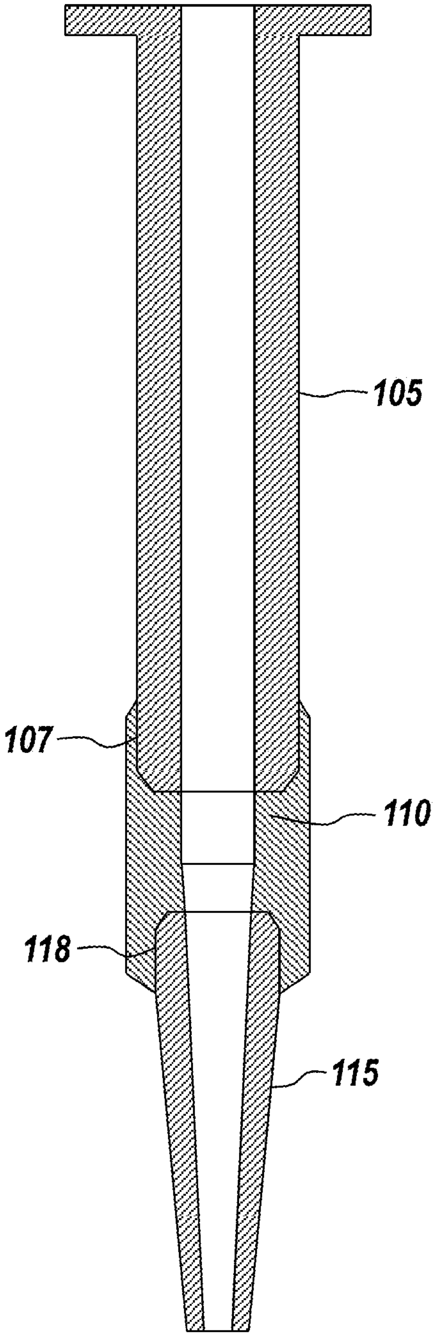
FIG. 1H shows a cross-sectional view of the preparation device of FIG. 1G.
Figure 1I:
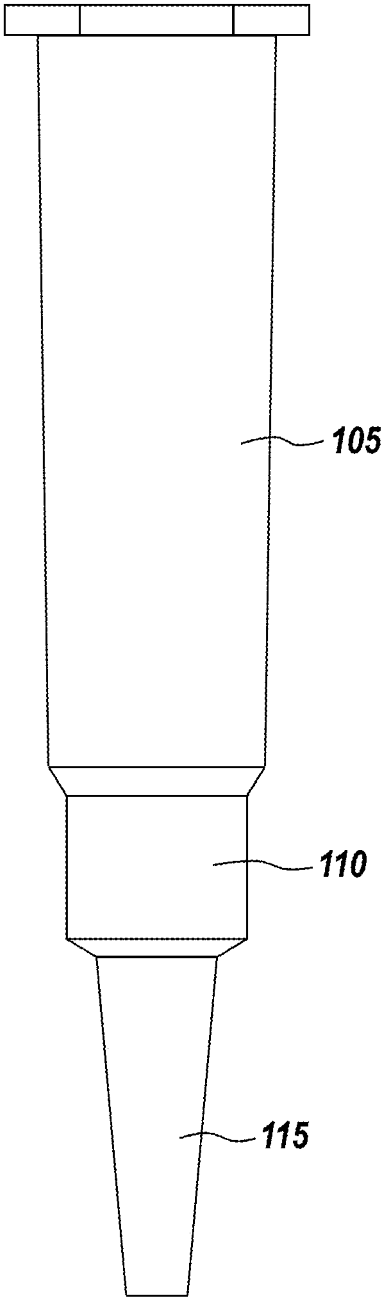
FIG. 1I shows a front view of still yet another embodiment of a preparation device in accordance with the present technology.
Figure 1J:
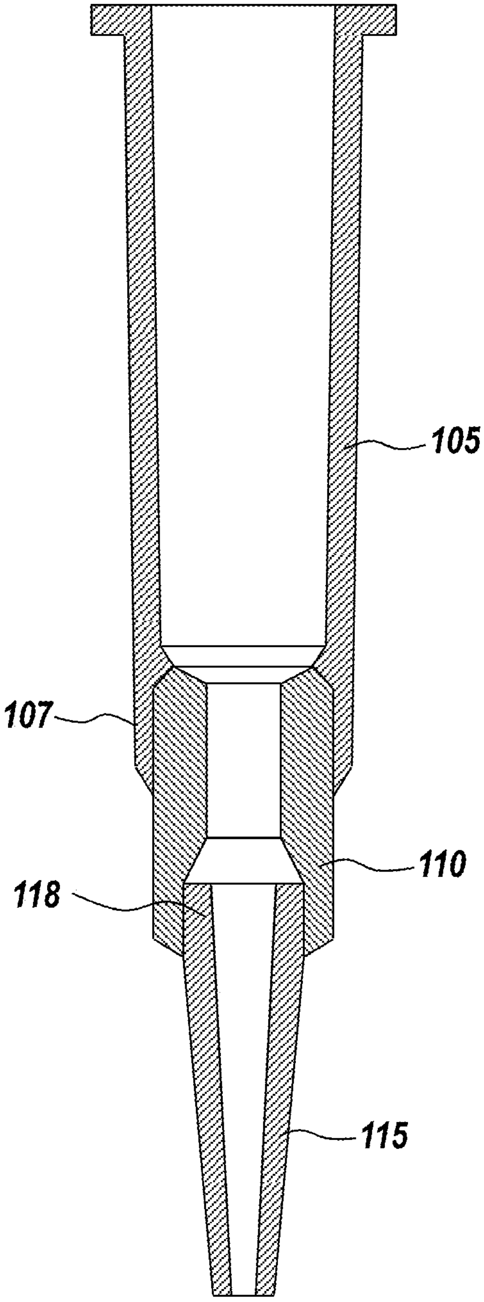
FIG. 1J shows a cross-sectional view of the preparation device of FIG. 1I.
Figure 1K:
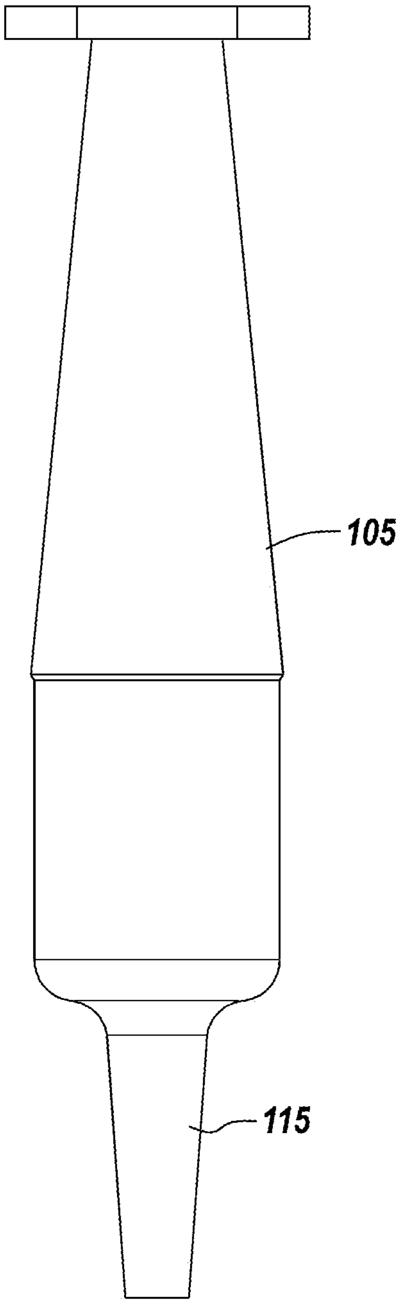
FIG. 1K shows a front view of another embodiment of a preparation device in accordance with the present technology.
Figure 1L:
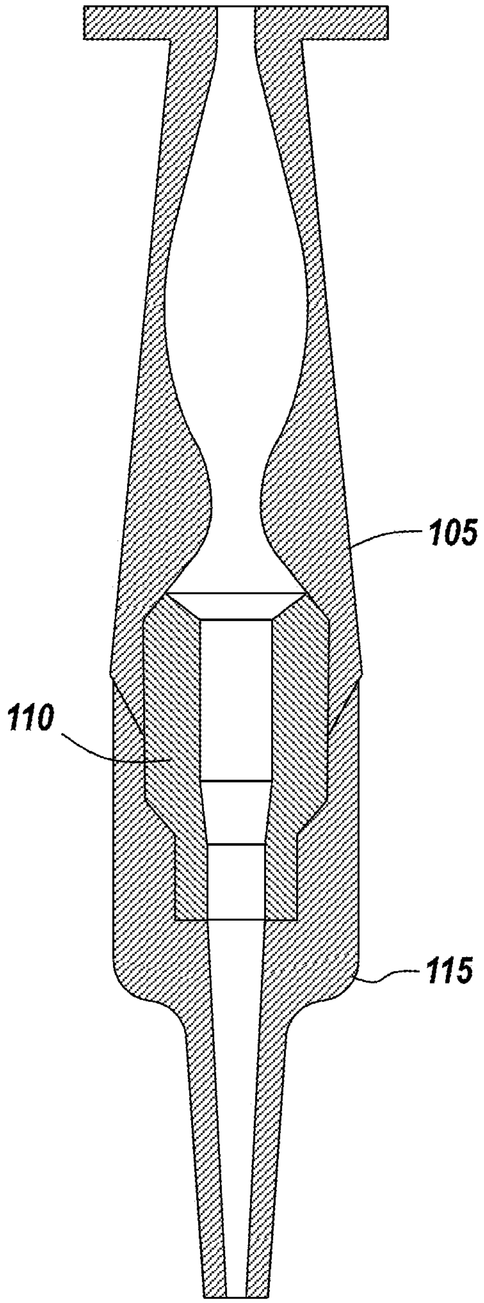
FIG. 1L shows a cross-sectional view of the preparation device of FIG. 1K.

While FIGS. 1A-1D illustrate an embodiment of a preparation device 100 in which connection between the modular pieces is accomplished by each end of the body portion 110 being accepted within a respective end of the reservoir portion 105 and the tip portion 115, other types of connections are possible. For example, in the embodiment shown in FIGS. 1E and 1F, instead of the outlet portion 107 of the reservoir portion accommodating an end of the body portion 110 there within, the outlet portion 107 fits within the body portion 110. Similar to the embodiment shown in FIGS. 1A-1D, the inlet portion 118 of the tip portion 115 accommodates there within a respective end of the body portion 110. In the embodiment shown in FIGS. 1G and 1H, the body portion 110 accommodates both the outlet portion 107 of the reservoir portion 105 as well as the inlet portion 118 of the tip portion 115 within the interior of the body portion 110. And in the embodiment shown in FIGS. 1I and 1J, the outlet portion 107 of the reservoir accommodates an end of the body portion 110 there within, and the body portion 110 accommodates the inlet portion 118 of the tip portion 115 within the body portion's 110 interior. In yet another possible embodiment shown in FIGS. 1K and 1L, the body portion 110 is enclosed within the reservoir portion 105 and the tip portion 115. That is, the reservoir portion 105 and the tip portion 115 each extend about the body portion such that an end of each of the reservoir portion 105 and the tip portion 115 are in direct contact as shown in FIGS. 1K and 1*n* FIG. 1L.

Reservoir Types

Referring to FIGS. 2A-2H, shown are eight possible reservoir portion type configurations that can be used in embodiments of the present technology. In general, the reservoir portion interfaces with a handheld pipette (for a manual platform) or an automated pipette/liquid manipulator (for automation platforms). In certain embodiments, the interface can be designed to interface with a pipette capable of manipulating liquids bi-directionally (or simply in one direction) for ease of sample loading and washing. For each volume and brand of pipette or automated liquid manipulator, a reservoir is specifically designed to interface with the liquid manipulator (i.e., the pipette of the manual or the liquid handler of the automated). As a result, a top end 103 of the reservoir portion can be shaped or configured to interface with a particular liquid manipulator—and thus can differ between the different possible reservoir types. The bottom end or outlet end 107, on the other hand, is standardized such that it can connect or interface any type of modular body portion in assembling a customized device 100. In other embodiments, the reservoir may include a top end that has a universal connection that can connect or interface to multiple types of liquid handlers or pipettes. The volume of the reservoir portion can also be customized to be applicable for specific liquid handling devices. For example, the volume or size of the reservoir portion can be customized to work with the most common liquid handing devices (e.g., Gilson and Eppendorf single as well as multi-channel pipettes in the 200-300 microliter range). In addition, the reservoir portion type can be customized to work with positive pressure or vacuum manifolds. In one embodiment, a single reservoir portion functions with large volume pipettes (e.g., P100 to P300) as well as low volume pipettes (e.g., P1 to P20) to achieve a final sample elution for end-to-end sample preparation with a single tip. End 103 can be adapted or configured to work with one or more of the following types of liquid handlers: for manual platforms (Gilson, Pipetteman; Waters Corporation, Vacuum Manifold or Positive Pressure Manifold; Eppendorf, Research Plus; TTE Laboratories, EON S; Drummond Scientific, Pipet-Aid; SCILOGEX Levo Pipette), for automation platforms (Hamilton, MPE2 (Positive Pressure) or STAR/STARlet 8-Channel Head; Tecan, Freedom Evo Fixed Tip, Freedom Evo LiHa (Disposable, Liquid Arm), Freedom Evo LiHa (Disposable, Air Arm), Fluent FCA (Air Arm), or Fluent FCA (Liquid Arm); Andrew Alliance, Pipette Plus; Apricot, Even 96 (Positive Pressure).

Figure 2C:
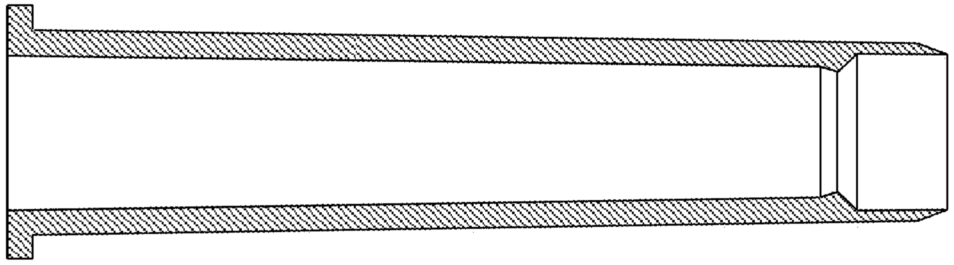
FIGS. 2A-2H each show a cross-sectional view of an embodiment of a modular reservoir segment in accordance with the present technology.
Figure 2B:
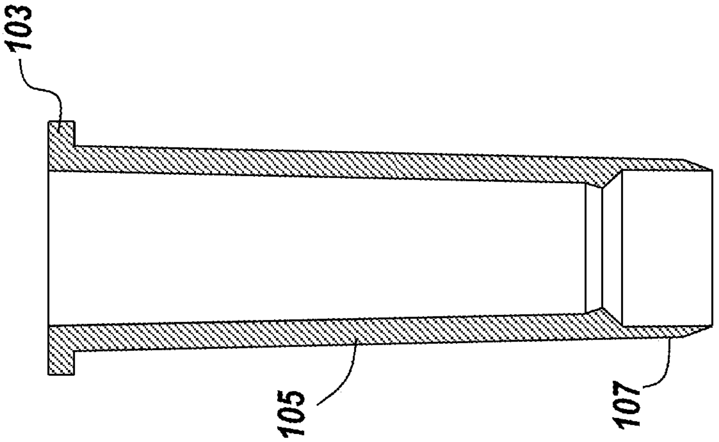
Figure 2A:
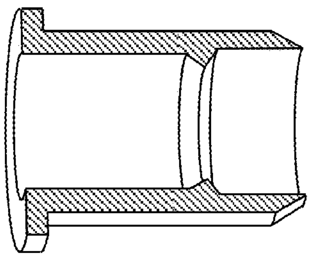

In addition to specific geometries for interface connection with different liquid handlers (e.g., different configurations of end 103), reservoir portions can have different lengths and/or different volumes to provide an appropriately customized reservoir portion 105 for a desired sample processing. Shown in FIG. 2A is a cross-sectional view of a reservoir portion in accordance with an embodiment of the present technology. The embodiment shown in FIG. 2A has a small working volume and a small length. The embodiment shown in FIG. 2B has a medium length, and also its diameter is larger than that shown in FIG. 2A. As result, the working volume of this embodiment is greater than that shown in the embodiment of FIG. 2A. A third embodiment (or third reservoir portion type) is shown in FIG. 2C in cross-section. The internal diameter of this reservoir portion is smaller than the diameter shown in FIG. 2B, but it has a longer length. In general, for automation platforms, reservoir volumes range between about 5 to 6 mL to about 4 to 5 μL; whereas for manual platforms, large reservoir volumes can exceed 5 to 6 mL by 10 times (e.g., 60 to 65 mL). Manual platforms can have any reservoir volume, typically between 65 mL and 4 μL. As a result, the range of lengths, widths, and internal diameters can vary depending on use.

Figure 2H:
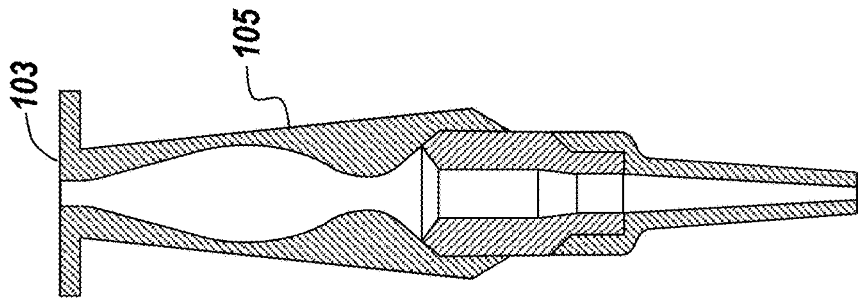
Figure 2G:
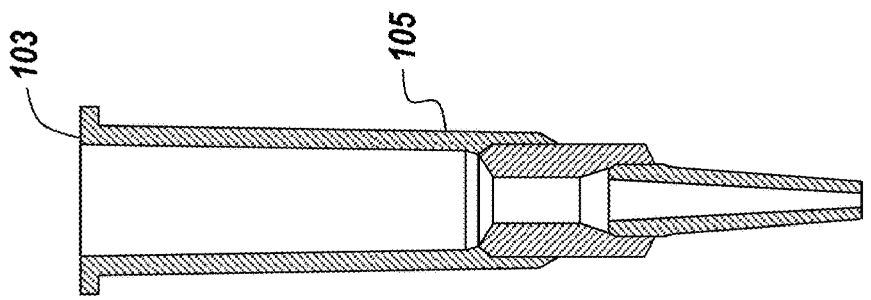
Figure 2F:
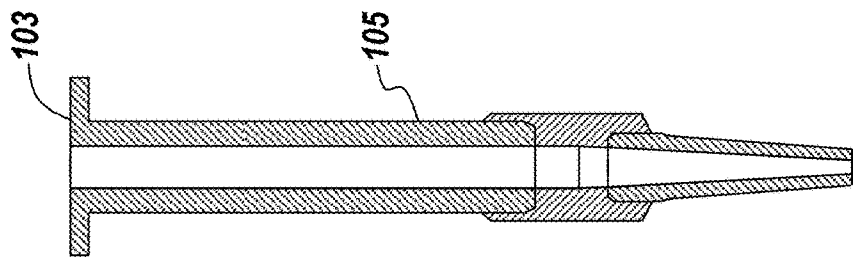
Figure 2E:
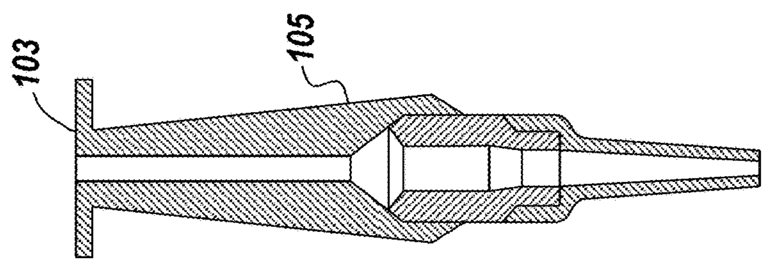
Figure 2D:
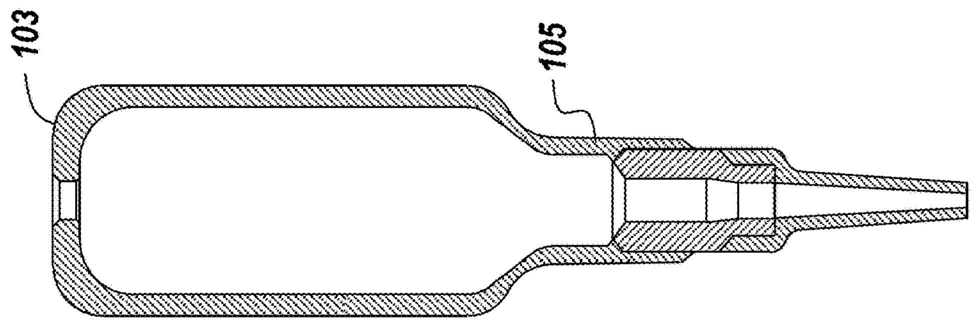

Internal geometries of the reservoir portion 105 can also be varied to accommodate a desired volume in a desired form factor. For example, FIGS. 2D-2H illustrate various, exemplary embodiments of reservoir portions 105. In the embodiment shown in FIG. 2D, the reservoir portion 105 has a large internal volume with end 103 opening to a small connection port for a liquid handler. In contrast to the embodiment shown in FIG. 2D, the reservoir portion 105 of FIG. 2E has a much narrower internal volume for accommodating fluid entering from end 103. The reservoir portions 105 shown in FIGS. 2F and 2G, each have a similar length, but their fluid volume holding capacity differs due not only to the diameter of the reservoir portions but also due to wall thickness of the reservoir portions. In the embodiment shown in FIG. 2F, the walls of the reservoir portion are much thicker than the walls shown in the embodiment of FIG. 2G. The internal diameter of the reservoir portion 105 of FIG. 2G is also greater than that of the embodiment of FIG. 2F, as can be compared easily at ends 103. FIG. 2H shows yet another possible embodiment of a reservoir portion 105. In this embodiment, the internal walls which form the fluid volume holding capacity of the reservoir portion 105 are curved to form a distinctive interior shape.

Figure 3B:
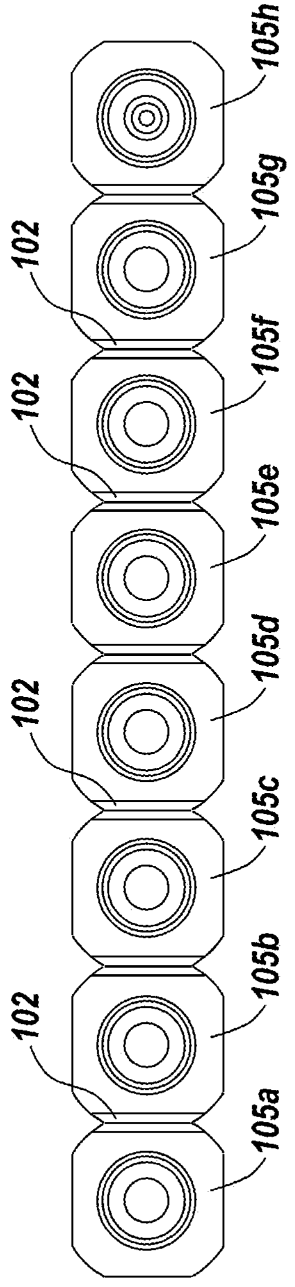
FIG. 3B shows top view of the strip shown in FIG. 3A, wherein each individual reservoir segment is detachably connected to at least one other individual reservoir.
Figure 3A:
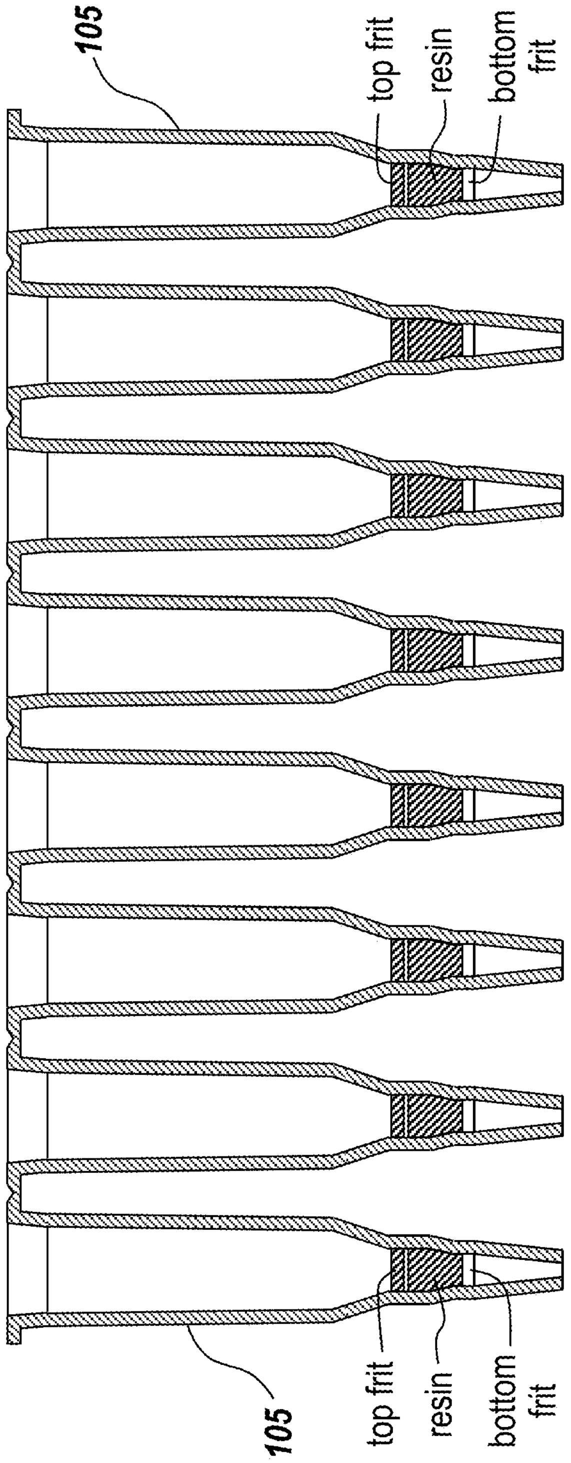
FIG. 3A shows a cross-sectional view of a plurality of modular reservoir segments detachably connected together to form a strip.

Reservoir portions can be further configured or adapted to meet different form factor needs. For example, some platforms or lab-ware are better suited to well plates or strip configurations. To provide additional form factor options, reservoir portions can be made in a strip configuration, with each individual reservoir portion detachably connectable to a neighboring reservoir portion. For example, FIG. 3A shows a cross-sectional view of an embodiment in which 8 reservoir portions are detachably connected at the top end 103 to form a strip. FIG. 3B is a top view of the embodiment shown in FIG. 3A and shows a top surface having 8 individual (not fluidly connected) reservoir portions (105*a*-*h*) which are physically connected at the top ends 103 at a connection interface 102. The connection interface 102, in some embodiments, is detachable (e.g., perforated or otherwise breakable). In other embodiments, the connection interface 102 need not be detachable. In certain embodiments, not shown, the strip can include any number of reservoir portions, for example, 6, 8, 12, 24, 48 etc. Other form factors are possible too, such as a grid of detachable reservoir portions (e.g., 4 rows of 12 for a total of 48 reservoir portions arranged in a grid, or 6 rows of 8 reservoir portions, or even 96 reservoir portions arranged in a grid formation).

Tip Types

Figure 4A:
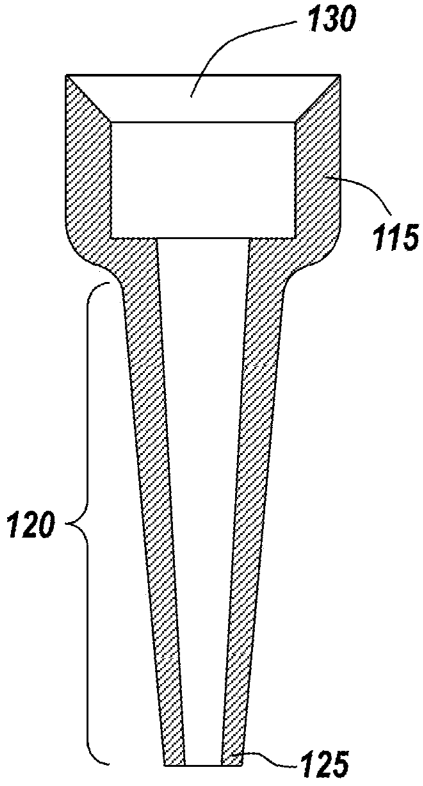
FIGS. 4A-4C each shows a cross-sectional view of a different embodiment of a modular tip segment in accordance with the present technology.
Figure 4B:
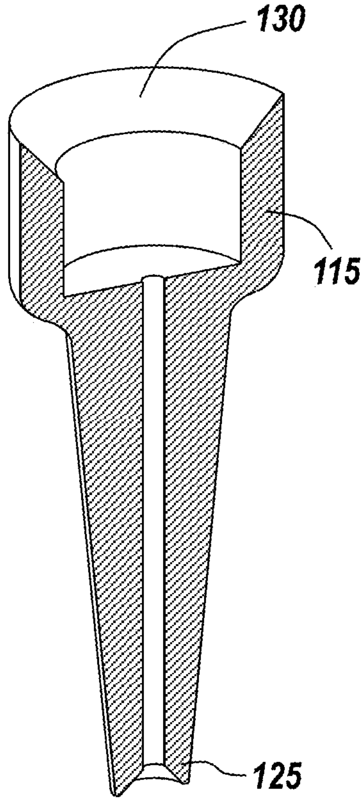
Figure 4C:
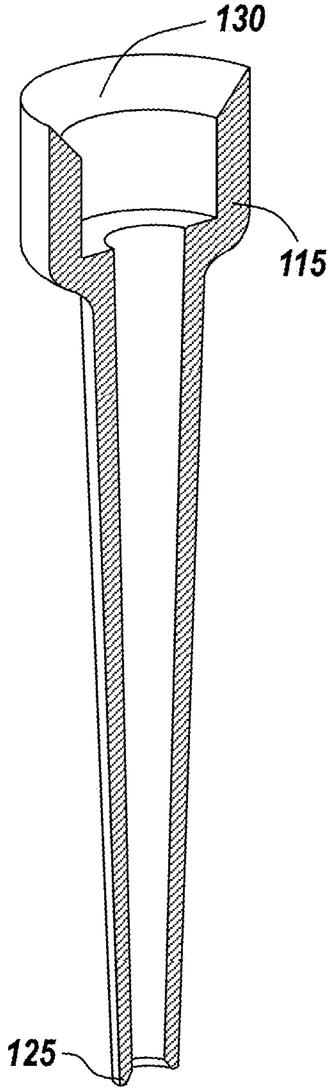

Referring to FIGS. 4A-4C, shown are three possible tip portion type configurations that can be used in embodiments of the present technology. In general, the tip portion interfaces with a collection unit or analyzer/detector (e.g., elution plate or UV detector). As a result, the outflow (i.e., droplet shape, volume, etc.) from the tip portion is selected in accordance with the downstream needs (i.e., type of collection or type of analyzer/detector). In general, the tip portion types can be modified or customized with respect to diameter of the tip, length of the tip, and droplet volume or shape. The outlet of the tip can be designed to specifically to release droplets of a desired volume. In general, it is desirable to have tip portions that have a dead volume of 10 microliters or less (i.e., 5 microliters or less, 4 microliters or less, 3 microliters or less, etc.). Some embodiments can feature a removable guard or pre-filter on the droplet end of the tip. The pre-filter acts as a gross filter for food and/or environmental applications or other in other samples where detritus could clog downstream frits or detectors. In some embodiments, multiple filters can be used in a single tip portion or an additional filter assembly can replace a filter assembly that has clogged.

The outlet portion 120 of the tip portion 115 can be customized in a number of different ways to address outflow. For example, FIGS. 4A-4C illustrate three different tip portion types, each of which can be used as a modular portion to create a customized device 100. Shown in FIG. 4A is a cross-sectional view of a tip portion in accordance with an embodiment of the present technology. The tip portion of FIG. 4A has a relatively wide internal diameter and a medium length tip. As a result, the tip of FIG. 4A can handle a residual volume of about 5 to 20 μL or more. FIG. 4B illustrates a cross-sectional view of another embodiment in accordance with the technology. In the tip portion shown in FIG. 4B, the internal diameter is reduced in comparison to FIG. 4A. As a result, the residual volume capabilities of the tip of FIG. 4B is less than that of FIG. 4A. FIG. 4C shows a third possible embodiment for a modular tip portion type. In the embodiment shown in FIG. 4C, the length is increased over that shown in both of the previous two embodiments. The internal diameter of the tip of FIG. 4C is between that shown in FIGS. 4A and 4B. That is, the internal diameter of the tip of FIG. 4C is not as large as that of FIG. 4A, but is larger than that of FIG. 4C. By customizing the length as well as the size of the internal diameter, the residual volume of the tip can be appropriately matched to the downstream collection or analytical device.

Figure 5A:
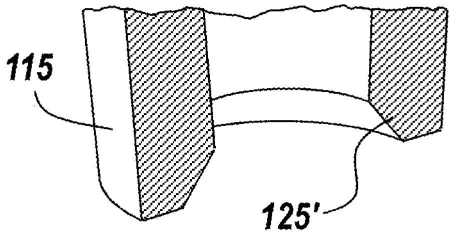
FIG. 5A shows an embodiment of a droplet outlet of a modular tip segment in accordance with the present technology.
Figure 5B:
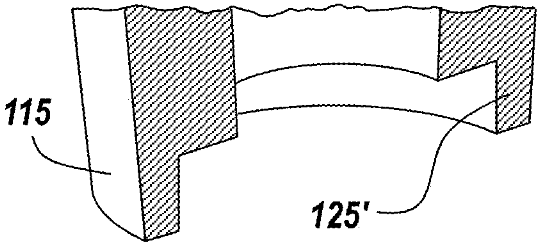
FIG. 5B shows another embodiment of a droplet outlet of a modular tip segment in accordance with the present technology.

In addition to customizing the residual volume of the fluid within a particular tip portion type, the drop shape and size can be further customized through modifying a droplet outlet. Shown in FIGS. 5A and 5B are two possible droplet outlet configurations. The droplet outlet shown in FIG. 5A has a countersink within an outlet end 125. In contrast, the droplet outlet shown in FIG. 5B has a counterbore within outlet end 125'. Without wishing to be bound by theory, the shape of the droplet outlet opening affects the droplet size and shape of the droplets flowing from the tip. As a result, by modifying, customizing, or selecting an outlet shape a desired droplet shape can be generated for a targeted use.

In the assembly of a customized device in accordance with the invention, an end 130 opposing the outlet end 125 of the tip portion fluidly connects to a body portion 110 (see, FIGS. 4A-4C). In general, end 130 is designed to connect to/interface with a portion of the body portion 110. In embodiments, the end 130 of tip portion 115 is standardized to interface and fluidly connect with multiple different types of body portions 110.

Body Types

Referring to FIGS. 6A-6E, shown are five possible body portion type configurations that can be used in embodiments of the present technology. In general, the body houses a resin or other sample processing material. In embodiments, the resin or other sample processing material is sandwiched within the housing between two frits (e.g., screens, meshes, membranes, etc.) that contain the resin. The shape of the body portion can be customized to accommodate a range of resin volumes and modes. For example, a number of different modes can be selected for use with the present technology, including, but not limited to, solid phase extraction, affinity capture, sample clean-up employing anti-human IgG, streptavidin, biotinylated targets, nanobodies, aptamers, and particles with custom ligands attached to the surface. As such, there are numerous types of resins that can be used in connection with the present technology. Possible resin types include, but are not limited to, phospholipid removal resins (e.g., hydrophobic-lipophilic balance, Ostro™ resin and Oasis® resin, both available from Waters Corporation, Milford, MA), ion exchange resin, reversed phase resin (desalting, silica, C18, C8, C4, alumina, Florisil®, available from US Silica, Berkeley Springs, WV), mixed mode resins, size exclusion resin, affinity resins (Protein A, Protein G, streptavidin, biotin, avidin, Ni-, silica-IMAC, lectin, borate, anti-human Fc, anti-insulin, anti-idiotype), phosphopeptide resins (e.g., $ZrO_2$, titanium); hydrophobic interaction resins, HILIC resins, amino propyl resins, cyano propyl resins, immobilized enzyme resins (e.g., trypsin, sialidase, glucuronidase), fluoro resins, metal resins (e.g., Ca, Fe, Ni, Ga), dispersive SPE materials (e.g., QuEchERS). The total amount of resin can be selected/customized for a particular use. In some embodiments, the resin volume ranges from about 1 microliter to 1 milliliter. In an embodiment directed to a mixed mode separation, multiple resin beds can be stacked back to back, with or without frit between them within a single body portion 110. Alternatively, multiple body portions can be used together (either permanently joined together or removably stacked back to back) within a single device to provide a mixed mode or customized resin combination for sample processing.

Figure 6A:
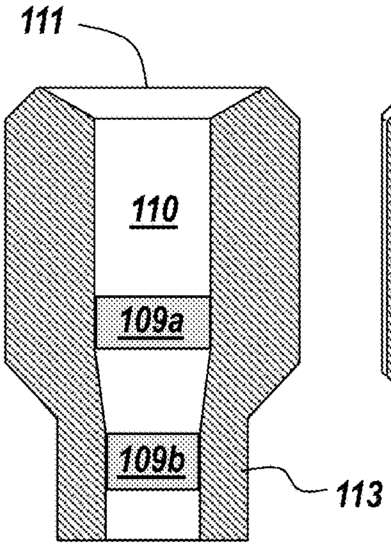
FIGS. 6A-6E each shows a cross-sectional view of a different embodiment of a modular body segment in accordance with the present technology.

FIGS. 6A-6E provide cross-sectional views of a number of possible body portion types. While five different embodiment types are shown, other body portion type configurations are possible. In general, body portion type configurations can be customized to accommodate various resin volumes, bed lengths, and bed aspect ratios. In addition, different resins can be accommodated and even multiple resin beds or different resin types within a singular bed portion are possible. FIG. 6A illustrates a bed portion type in which a short bed length of resin is contained between two frits 109*a* and 109*b*. The resin bed volume does not fill the entire internal volume of the body portion 110 in the embodiment shown in FIG. 6A; there is an empty flow channel or space above frit 109*a*. Top end 111 and bottom end 113 interface with other modular parts of device 100. That is top end 111 of body portion 110 is configured to interface with the outlet end 107 of the reservoir portion 105; whereas bottom end 113 is configured to interface with the inlet portion 118 of the tip portion 115.

Figure 6B:
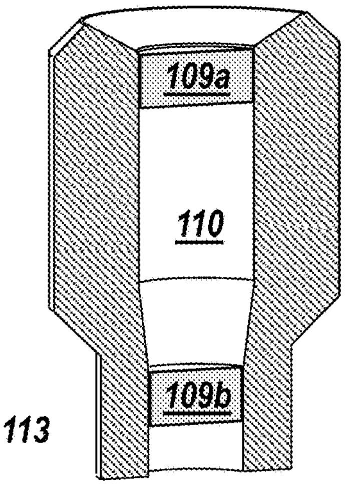

The body portion type shown in FIG. 6B differs from the embodiment shown in FIG. 6A in that close to if not the entirety of internal flow path volume of the body portion is filled with the resin bed and its retaining mechanism. That is, instead of having an empty flow channel or space above frit 109*a* as shown in FIG. 6A, the top frit 109*a* is positioned proximate to and directly adjacent to top end 111 of the body portion 110 in the embodiment in FIG. 6B. As a result, the body portion in FIG. 6B has a longer bed length than the embodiment shown in FIG. 6A. The width of the bed can also be customized/modified to accommodate different types of resins or different modes of processing. In the embodiment shown in FIG. 6C, the width of the bed has been increased as compared to the embodiments shown in FIGS. 6A and 6B. In addition, a taper at a bottom end of the resin bed is utilized, resulting in different diameters of the frits 109*a* and 109*b* used to secure the bed.

Figure 6C:
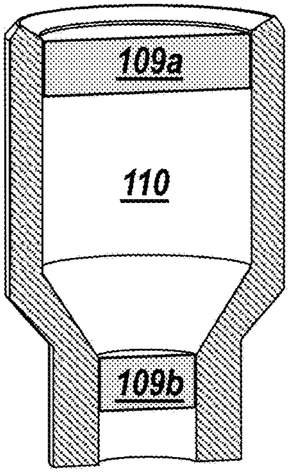
Figure 6D:
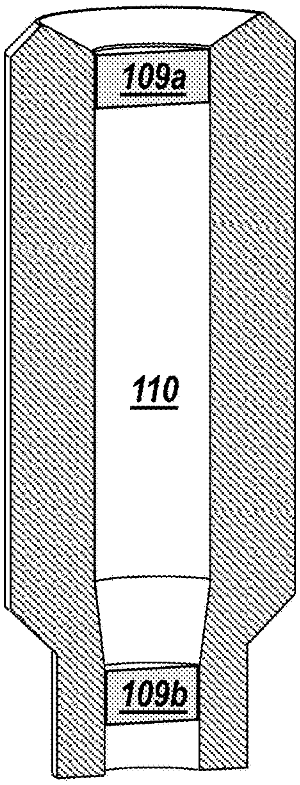

The body portion type shown in FIG. 6D has been customized to provide a longer bed length. A longer bed length can be appropriate if a longer interaction with the resin type is needed, or if a mixed-mode operation in which two or more (e.g., multiple) different bed layers of different resin types are packed along the length of the body portion 110. While the embodiment shown in FIG. 6D includes just a top frit 109*a* and a bottom frit 109*b*, in some embodiments, not shown, including multiple bed layers, additional frits separating each bed layer can be used. The body portion type shown in FIG. 6E, like the embodiment shown in FIG. 6D has a longer bed length. The embodiment shown in FIG. 6E further has a large bed width, thereby increasing the volume of resin and providing a larger aspect ratio of the bed than for the embodiment shown in FIG. 6D.

Figure 6E:
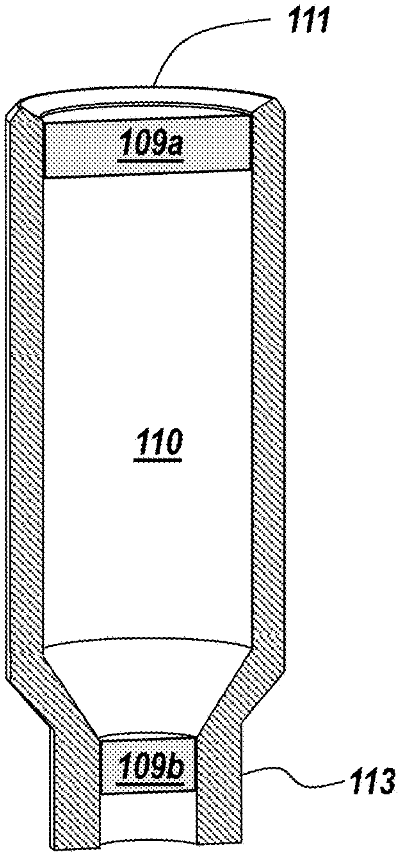

The frits 109*a* and 109*b* are used confine the resin bed in a specific area of the body portion 110. For example, the frits help to secure the resin in a location within the body portion and inhibit migration of the resin or other sample processing material from flowing out of the body portion 110. The type of frits used (e.g., material, shape, thickness, pore size, pore shape, pore volume, etc.) are selected for optimized usage with the type of resin(s). For example, when using a 50 micrometer monodisperse spherical particles as the resin type, a frit with an average pore size of 40 micrometers and a thickness of about 0.75 mm can be used to secure the resin media at maximum solvent flow rates. Possible frit materials include, but are not limited to polyethylene, polypropylene, PEEK, and Teflon. Frit material can be tuned to be hydrophilic or hydrophobic depending on application. In some embodiments, frits 109*a* and 109*b* can be similar or identical to each other in one or more of material type, size, shape, and pore characteristics. For example, as shown in the embodiments of FIG. 6A, frits 109*a* and 109*b* are the same size and shape. However, in other embodiments, the frits need not be identical or even similar. For example, as shown in the embodiments of FIGS. 6C and 6E, frits 109*a* have different dimensions than frits 109*b*. In some embodiments, frits 109*a* or 109*b* can be formed of multiple, stacked frits. And in certain embodiments, more than two frits can be present in a singular body portion 110. For example, more than two frits can be used to separate different resin bed types; more than two frits can be used to secure a resin bed; more than two frits can be used to act as a filter; and/or more than two frits can be used to act as a flow restrictor. And in some embodiments, just a single frit can be used. By slowing solvent flow (i.e., using one or more frits as a flow restrictor), more time is allowed for the liquid sample to interact with the resin allowing, in some cases, for more effective sample processing.

Some embodiment of the modular body portions 110 can include removable lips, covers or flaps. For example, for shipment or storage of the modular body portions 110 separable lids covering the top end 111 and bottom end 113 of the body portion 110. The lids or other coverings protect the resin's integrity prior to use. In certain embodiments, the removable lids, covers or flaps are used in conjunction with a fully assembled separation device in accordance with the present technology (e.g., a device made from two or more, such as 3, modular components connected together). The lids, covers or flaps can be secured to the top and/or bottom portion(s) of the assembled device.

Coatings

Modular segments (i.e., reservoir portion 105, body portion 110, and tip portion 115) can be further modified/customized by adding coatings. Coatings can provide additional benefits/advantages during sample processing. Advantages include minimizing non-specific bonding (e.g., inhibit protein adsorption), additional separation capabilities, and wettability manipulation (e.g., hydrophilic/hydrophobic sections). Because each device is composed of two or more modular parts (e.g., 2, 3, 4, etc.), identical or different coatings can be applied to each modular part/segment. Specialized coating can also be added to specific parts (e.g., frits or filters) housed within the modular segments.

Coatings can be polymeric-based (e.g., for wettability or separation properties) or metal-based (for thermal and electrical properties). In general, coatings range in thickness from a monolayer to about 1 or 2 microns. In some embodiments, coatings are applied to the entirety of a modular segment. In other embodiments, coatings are applied to a portion (e.g., interface or outlet or inlet end). In addition, coatings applied to interface of one component can be applied to an interface of a mating component. For example, if a coating is applied to outlet 107 of the reservoir portion 105, a similar coating can be applied to the top end 111 of a mating body portion 110.

Modular Segments Selected to Form a Customized/Bespoke Sample Processing Device

Device 100, shown for example in FIGS. 1A-1L, combine a selected and/or modular reservoir portion 105, a selected and/or modular body portion 110, and a selected and/or modular tip portion 115 together to form a customized device. Each modular segment type (i.e., reservoir, body, tip) is selected in order to optimize a specific sample processing result. That is, a specific reservoir portion is selected, a specific body portion is selected, and a specific tip portion is selected to meet the needs of the sample processing and lab-ware used (e.g., platform type).

In one embodiment, a customized liquid sample preparation or processing device is produced to accommodate a specific liquid handling platform (e.g., a specific liquid manipulator) and to expel a specific droplet shape from the customized device. In particular, a method of producing a liquid sample preparation device includes: selecting a modular reservoir portion based on a desired liquid manipulator interface design (e.g., manual platform, Gilson, Pipetteman); selecting a modular body portion based on a desired sample preparation receptacle characteristic (e.g., resin type, resin volume, mix-mode separation, bed length, etc.); selecting a modular tip portion based on desired outlet droplet characteristic (e.g., droplet size, droplet shape, etc.); and fluidly connecting the modular reservoir portion, the modular body portion, and modular tip portion. Fluid connection can occur for example, by connecting a second end of the modular reservoir portion to a first end of the modular body portion, and connecting a second end of a modular body portion to an inlet of the modular tip portion to create a fluid path through the device.

Figure 7A:
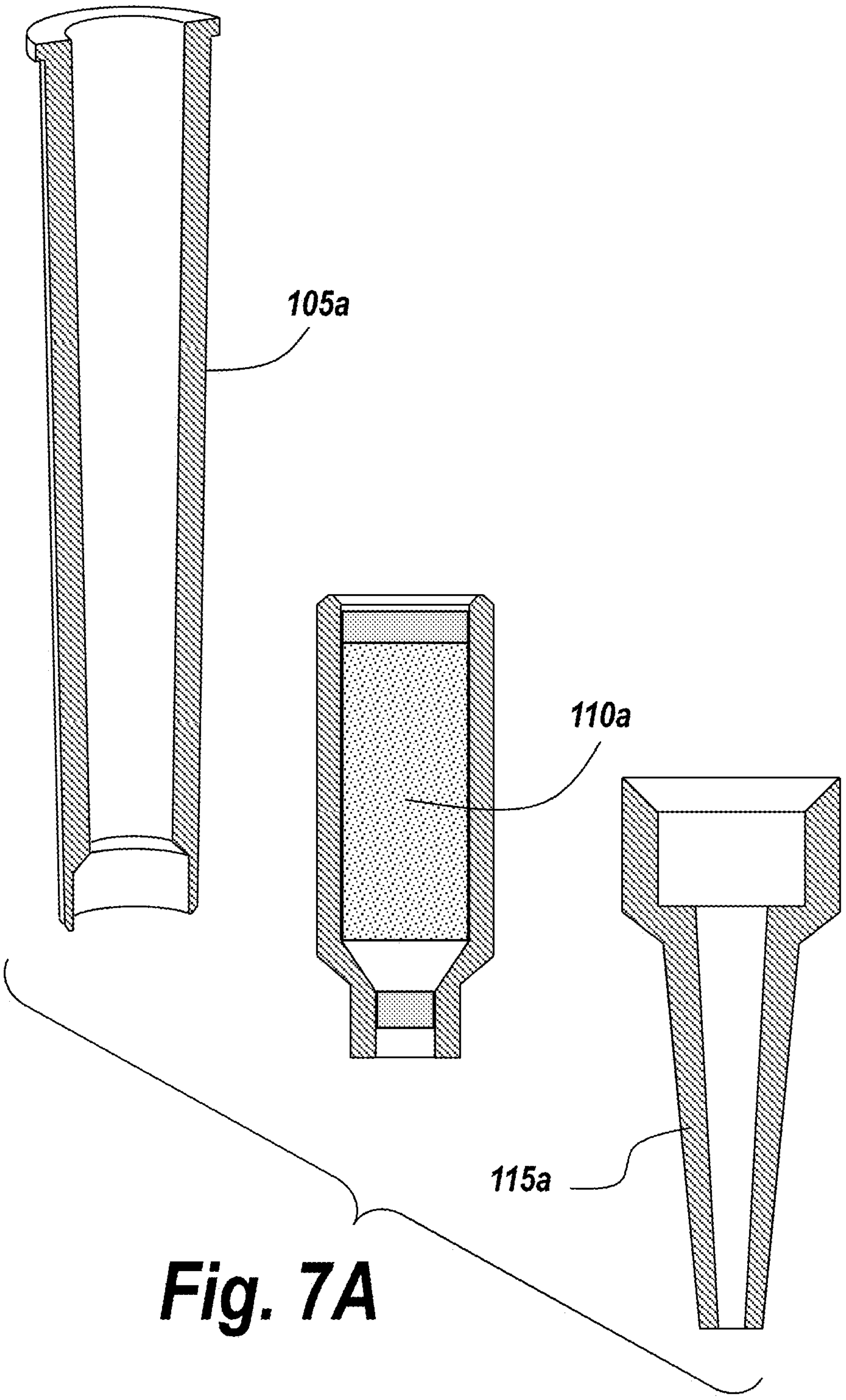
FIG. 7A illustrates a possible combination of modular elements to form a customized preparation device in accordance with an embodiment of the present technology.
Figure 7B:
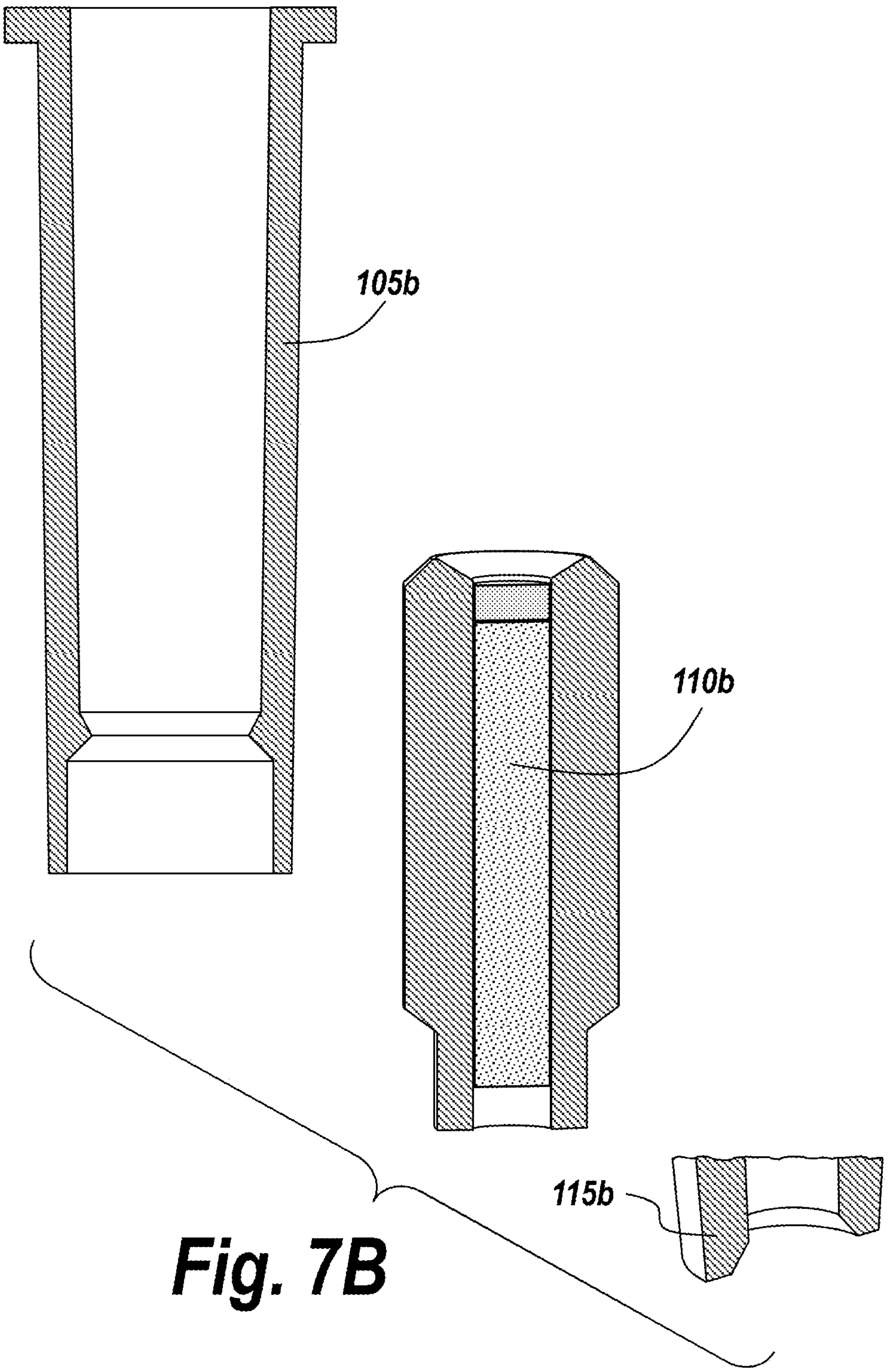
FIG. 7B illustrates another possible combination of modular elements to form a customized preparation device in accordance with another embodiment of the present technology.
Figure 7C:
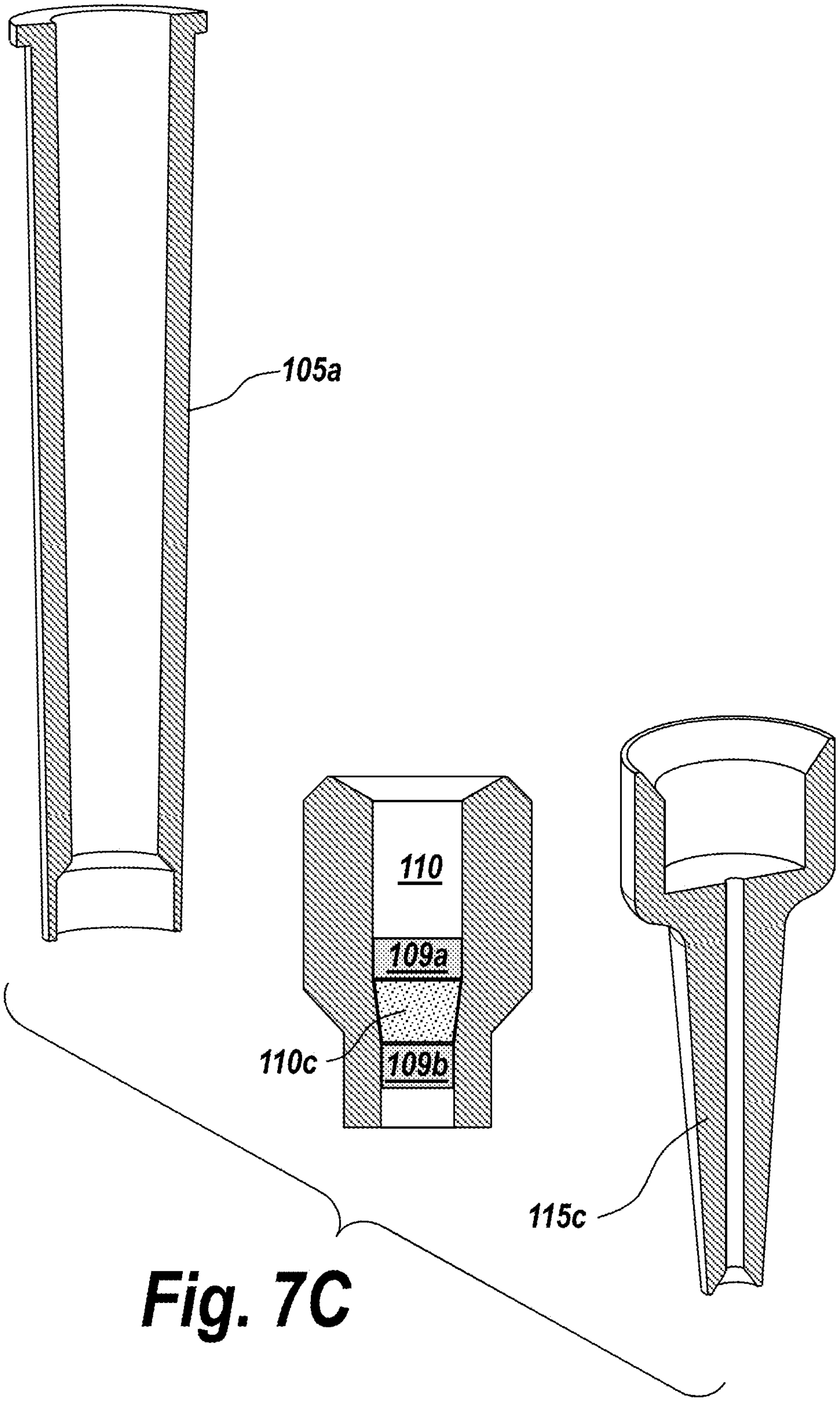
FIG. 7C illustrates yet another possible combination of modular elements to form a customized preparation device in accordance with another embodiment of the present technology.

In addition to selecting each of the modular segments based on platform or delivery of processed sample requirements, the modular segments can be selected and combined together to build a customized device based upon the sample to be processed. For example, FIGS. 7A through 7C show three possible combinations of different modular segments to create customized sample processing devices in accordance with the present technology. Referring to FIG. 7A, a researcher or user who has a large volume, highly concentrated sample, with no special elution requirements (e.g., droplet shape and elution amount do not demand a specific form factor), can have a device customized for their particular needs by selecting a customized reservoir portion 105*a* that has a long length to handle the large volume of sample; selecting a body portion 110*a* that has a greater width of bed/larger aspect ratio to handle processing the highly concentrated sample; and selecting a customized tip 115*a* that allows fluid to flow freely from the tip.

For a user or researcher who has an average sample volume needing high dwell time for binding and critical elution volume requirements, a different set of modular segments can be combined to form a customized sample processing device. Specifically, referring to FIG. 7B, shown is a customized reservoir portion 105*b* (having a shorter length/lesser volume than that shown in FIG. 7A); a customized body portion 110*b* (having a narrower bed of resin with a smaller aspect ratio than that shown in FIG. 7A); and a customized tip portion 115*b* (having a tip outlet with a countersink to produce a specific droplet shape). To produce a customized device to meet this particular sample's needs, reservoir 105*b* is fluidly connected to body portion 110*b* and body portion 110*b* is fluidly connected to tip portion 115*b*.

Alternatively, for a user or researcher who has a large volume of highly diluted sample with limited analyte (or limited or expensive resin materials), a customized device can be produced to accommodate these needs. Specifically, referring to FIG. 7C shown is reservoir portion 105*a* (long length reservoir portion, same as shown in FIG. 7A); a customized body portion 110*c* (compact resin bed not extending through the entirety of the body portion and having an empty fluid space above, below or both a frit within the body portion); and a customized tip portion 115*c* (having a controlled volume tip length).

Other combinations of modular segments are possible, and one is not limited to the embodiments shown in FIGS. 2A-H (for reservoirs); FIGS. 4A-4C and FIGS. 5A and 5B (for tips); and FIGS. 6A-E (for bodies). Other possible customized modular segments embodiments for each of the reservoir portions (e.g., 105); the body portions (e.g., 110); and the tip portions (e.g., 115) are possible. To make the modular components compatible and fluidly connectable to each other one or more of the following techniques can be used. For example, in one embodiment, the modular segments can be made of a weldable material, and the selected reservoir portion can be welded to the selected body portion, which in turn can be welded to the selected tip portion to create the fluid path through the customized device. Another possible technique is to apply standard connection ends to the interfaces of the segments. That is, by providing each of the customized reservoir portion types (e.g., 105*a* and 105*b* shown in FIGS. 7A and 7B respectively) a second or outlet end that accepts and/or interfaces with all of the fluid inlet end of the customized body portion types (e.g., 110*a*, 110*b*, and 110*c* of FIGS. 7A, 7B, and 7C respectively), a modular assembly (e.g., easy connection between many different parts) can be implemented. A modular assembly approach with each connection ends allows for permanent connection as well as a removable connection.

Since this is a modular apparatus, the individual parts are attached together in such a way to form a liquid tight seal over pressures generated from a varied of liquid handling devices (e.g., liquid manipulators which insert liquid into the device at the reservoir portion). The tip portion is attached to the body portion which is attached to the reservoir portion. Permanent bonding techniques include heating, melting, gluing, radio frequency bonding, adding material (e.g., metal, plastic) at the interfaces to create a seal, compression using an adapter or ring, threading, ultrasonic welding, and other mechanical means (e.g., clamp, clasp, etc.). Alternatively, to take advantage of the modularity of the device, the bonding could be temporary or removable. This can allow for switching reservoir portion (e.g., changing the reservoir portion so that it can interface with a different liquid manipulator or liquid handing platform) or switching the tip portion (e.g., changing droplet shape or other droplet characteristic) during processing or even for the removal of both or one of the reservoir portion and tip portion for in-line or off-line processing, without modifying the remaining components. This type of switching or modification is possible due to standard fittings being incorporated in the body portion. That is, some embodiments feature body portions that have identical dimensions at both outlets, regardless of resin or configuration/type. Temporary or removably bonding techniques include threading, using a retaining clip, and snapping over a shoulder feature.

Figure 8A:
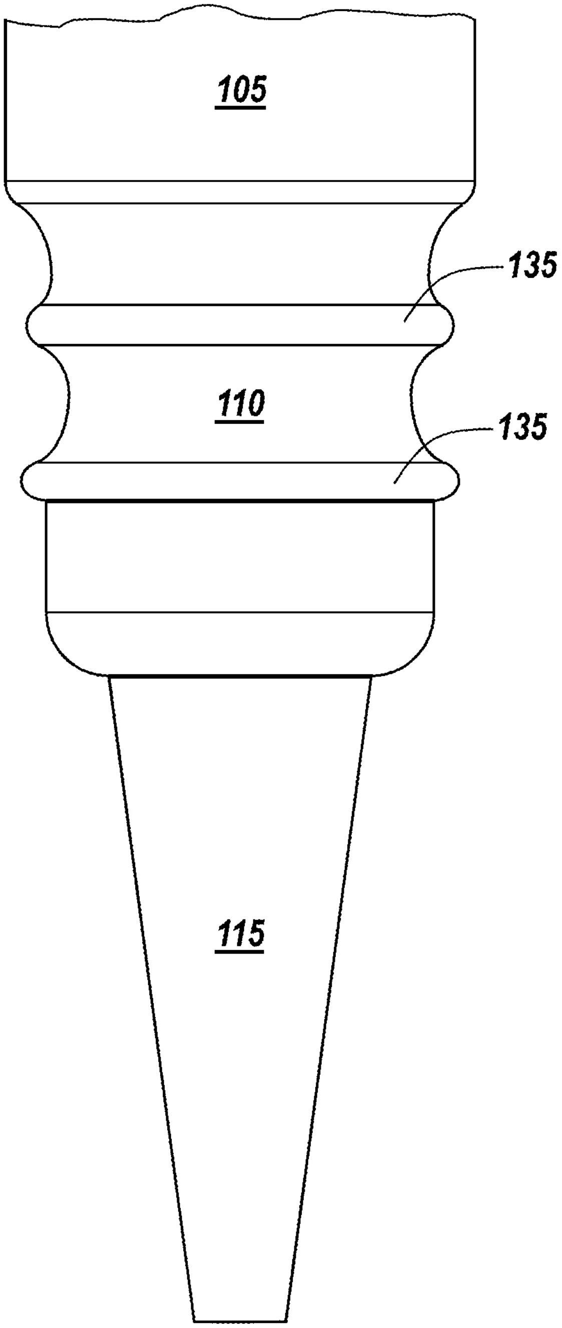
FIG. 8A illustrates an embodiment of a permanently connected customized preparation device in accordance with the present technology.

Referring to FIGS. 8A-8G, shown are four possible embodiments for connecting and sealing modular segments to create a fluid flow path through a customized device in accordance with the present technology. Some of these methods create a permanent connection, while others are removable allowing for replacement, cleaning, or further customization to the devices of the present technology. The embodiment shown in FIG. 8A is a permanent joining solution. In this embodiment, the body portion 110 is inserted between and into each of the reservoir portion 105 and the tip portion 115. To create the fluid seal between components and to permanently secure the device, the components are melted together around and in the area of the interfaces 135. In some embodiments, in addition to, or in the place of, the application of heat to create a melt band to secure the components together, adhesive can be used to create a leak-tight interface between components.

The embodiment shown in FIG. 8A is a permanent solution. Other embodiments can be removably joined (e.g., threaded mating fitting located at interface 135). However, it is noted that adhesive, heat, or weld joints can be added to removable connections to further secure and permanently secure modular segments together.

Figure 8B:
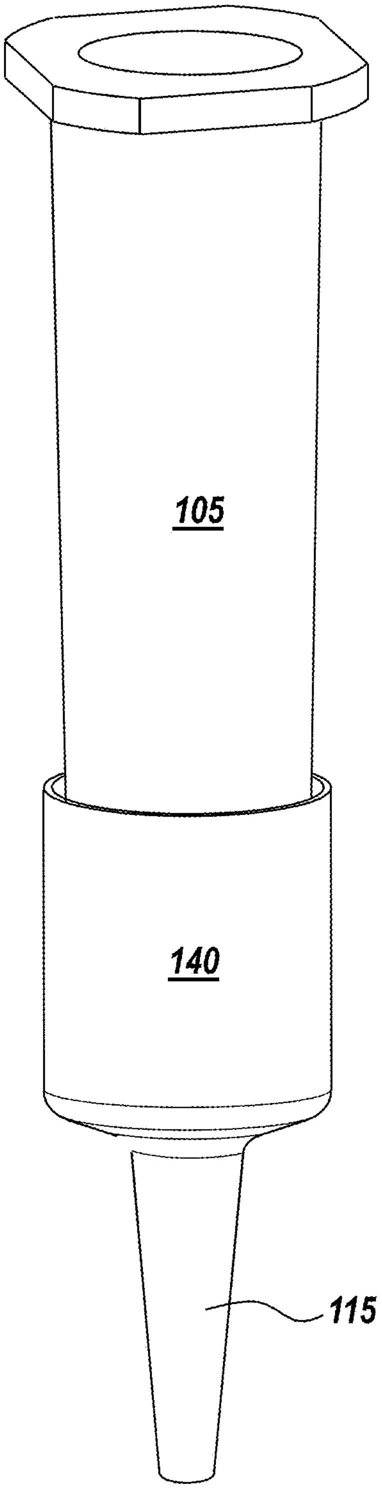
FIGS. 8B and 8C illustrate another embodiment of assembly of a connected customized preparation device in accordance with the present technology.
Figure 8C:
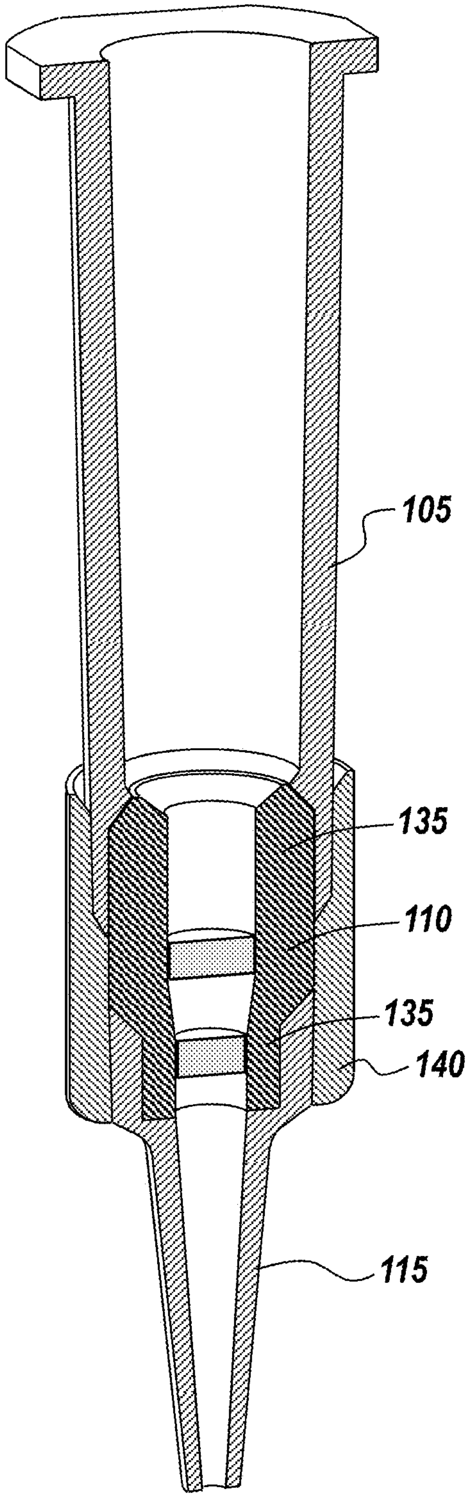

The embodiment shown in FIGS. 8B and 8C can be a permanent or removable connection. This embodiment features an interference fit between the body portion 110 and the surrounding reservoir portion 105 and the tip portion 115 together with a restrictive outer sleeve 140 that further secures the components in place. In one embodiment, the outer sleeve is made of a heat sensitive material that contracts and, in some instances, adheres to a portion of the reservoir portion 105 and the tip portion 115 creating a permanent bond. In other embodiments, restrictive outer sleeve 140 is biased in a contracting, radially inward direction, but is made of a material that can be either easily cut off or removed. The restrictive outer sleeve 140 surrounds and seals the interface between the reservoir portion 105 and the body portion 110 as well as the interface between the body portion 110 and the tip portion 115. In some embodiments, the restrictive outer sleeve is replaced with a mechanical clamp. In some embodiments, the permanent bond is created through an interference fit. In certain embodiments, the permanent bond is created with the aid of a permanently secured clamp.

Figure 8D:
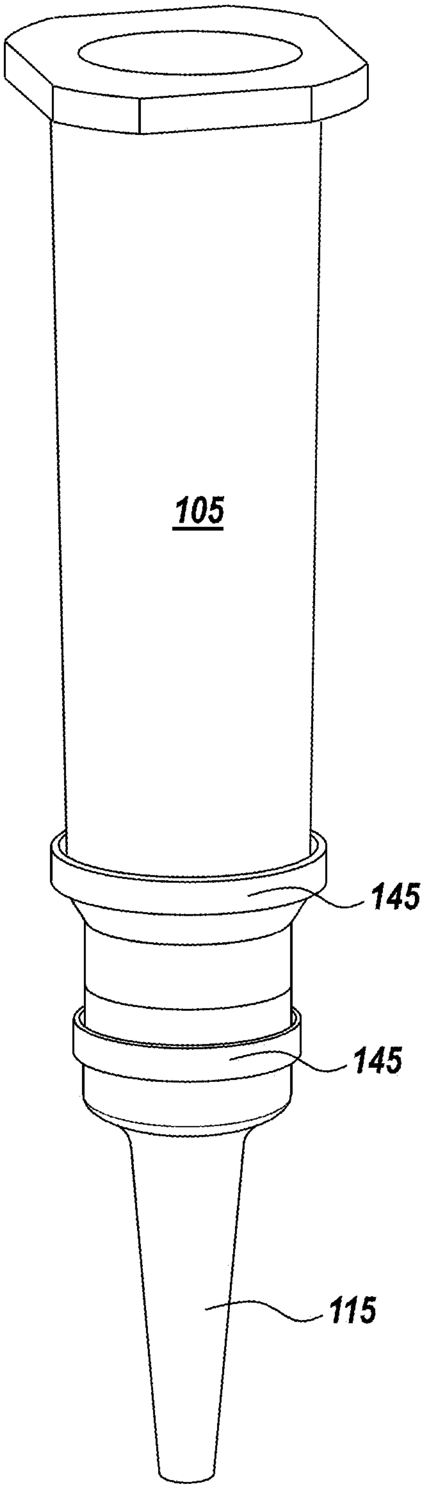
FIGS. 8D and 8E illustrate another embodiment of assembly of a connected customized preparation device in accordance with the present technology.
Figure 8E:
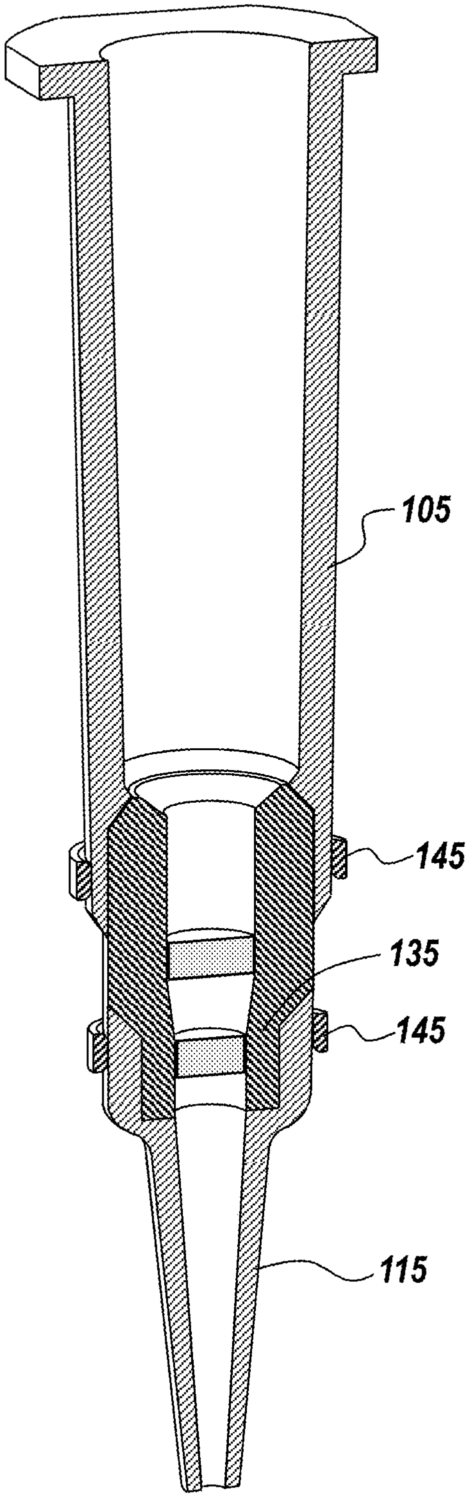

FIGS. 8D and 8E illustrate another possible assembly of the customized device of the present technology. In this embodiment, metallic rings 145 are added to the interfaces 135 to secure the modular segments together.

Figure 8F:
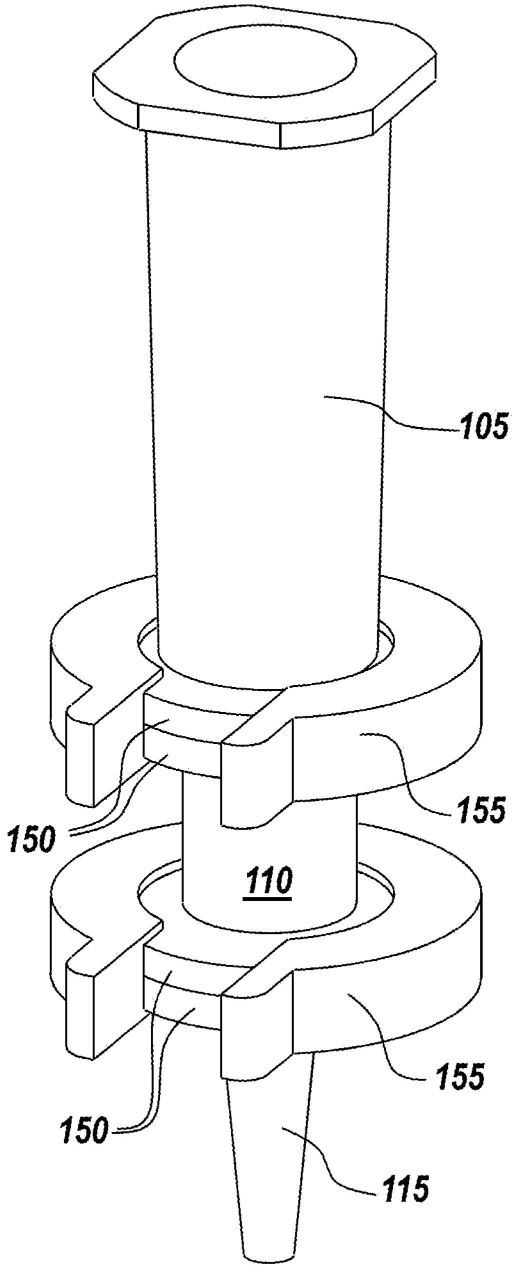
FIGS. 8F and 8G illustrate another embodiment of assembly of a connected customized preparation device in accordance with the present technology.
Figure 8G:
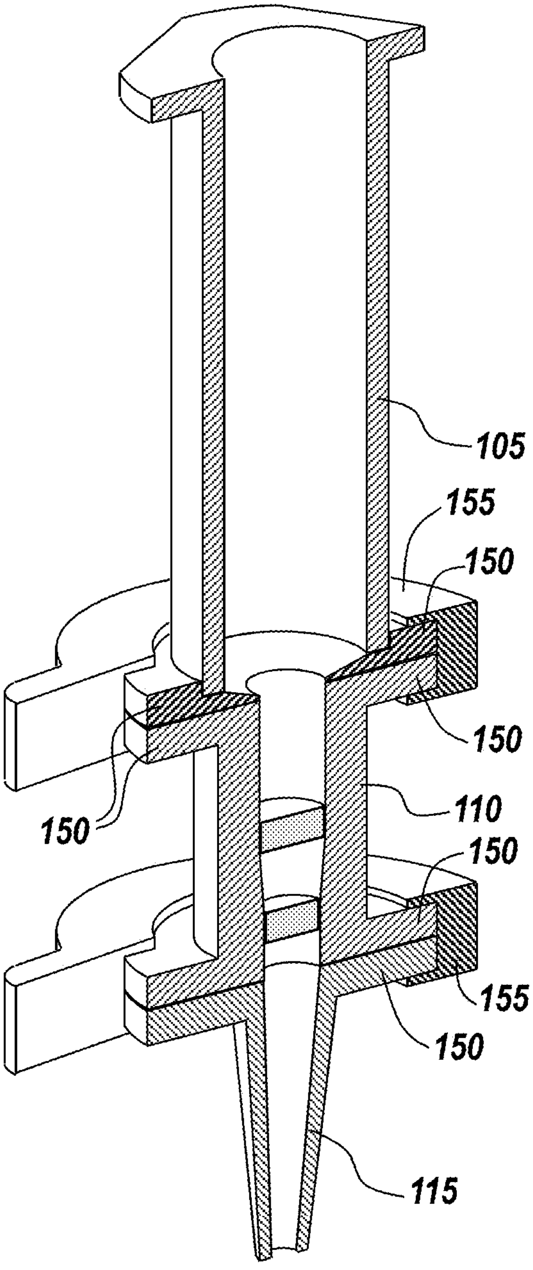

FIGS. 8F and 8G illustrate a further embodiment. In this embodiment, flange connections 150 have been added to the inlet and outlet ends of the body portion 110 and to the outlet end of the reservoir portion 105 and the inlet to the tip portion 115. The flange components 150 create flat interfaces that can then be sealed for a leak tight connection using clamps 155. These clamps are removable, thereby allowing for switching, cleaning or removal of any of the three modular segments 105, 110, and 115. However, in some embodiments, adhesive can be added to permanently seal the flanges 150 to their neighboring, adjacent flange.

Figure 9A:
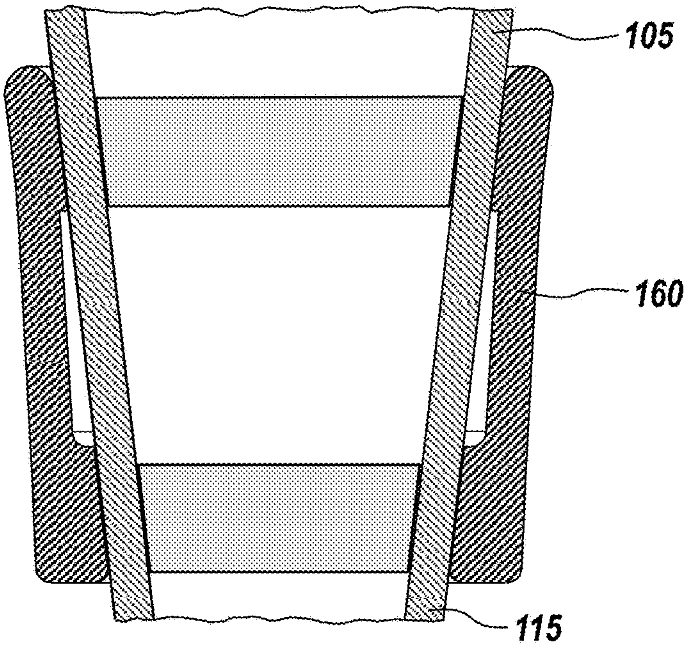
FIG. 9A illustrates an embodiment of a clamp for connecting and sealing a body segment between a reservoir segment and tip segment.
Figure 9B:
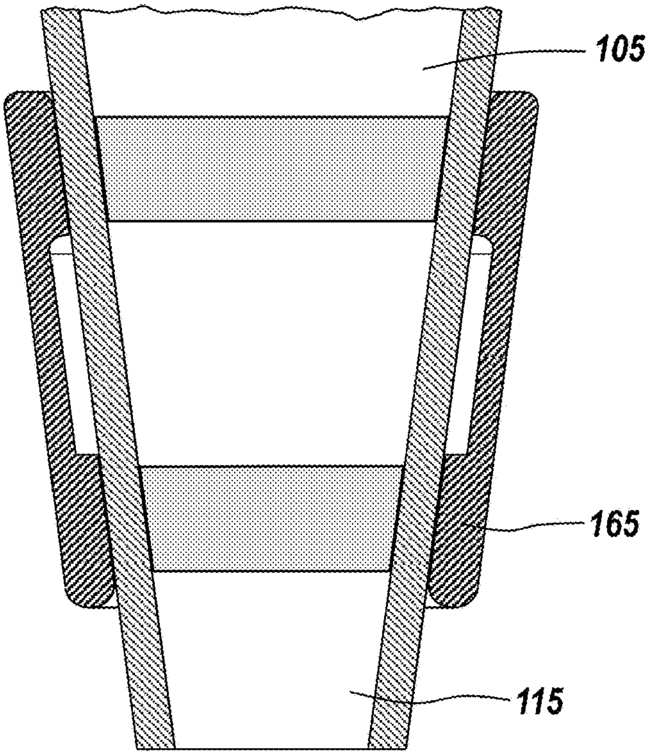
FIG. 9B illustrates another embodiment of a clamp for connecting and sealing a body segment between a reservoir segment and tip segment.

Other types of clamps or mechanical devices can also be used in securing and creating a liquid-tight connection between the modular component 105, 110, and 115. For example, FIGS. 9A and 9B illustrate two more embodiments in which clamps are added to secure the three modular components together for a fluid-tight connection. In the embodiment shown in FIG. 9A, a clamp 160 is integrated into the tip portion 115 and connects into the reservoir portion 105, sandwiching the body portion 110 therebetween and creating a fluid-tight connection (e.g., clamp facing up). In the embodiment shown in FIG. 9B, a clamp 165 is integrated into the reservoir portion 105 and connects into the tip portion 115, sandwiching the body portion 110 and creating fluid-tight connections (e.g., clamp facing down).

Figure 9C:
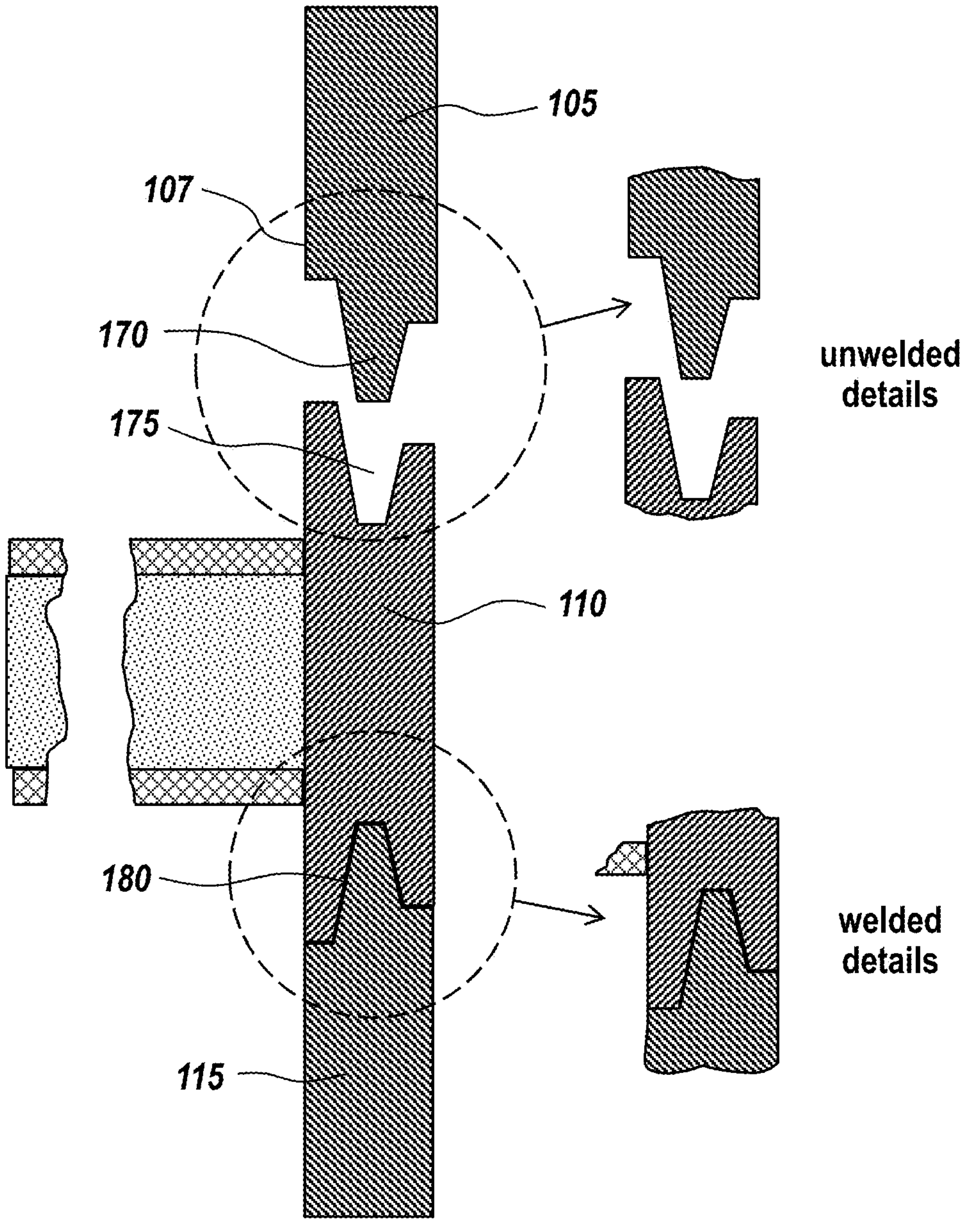
FIG. 9C illustrates an embodiment with welded or weldable connections between modular segments in a cross-sectional view.

Other types of connection between the modular segments 105, 110, and 115 are also contemplated by the present technology. For example, the three modular segments can be designed to mechanically connect and then use welding techniques to permanently secure the bond. For example, in the embodiment shown in FIG. 9C, the bottom end 107 of the reservoir portion 105 includes a projection 170. The body portion 110 which mates with the reservoir portion 105 includes a receiving/mating opening 175 for the projection 170. During assembly the projection 170 is inserted into opening 175 and secured with a friction (e.g., spin or ultrasonic) weld. Another mating opening is included on the bottom end of the body portion, which mates with another projection 180 extending from the tip portion. To secure the tip portion 115 to the device, a friction weld is created at the location of the inserted projection 180.

Figure 10A:
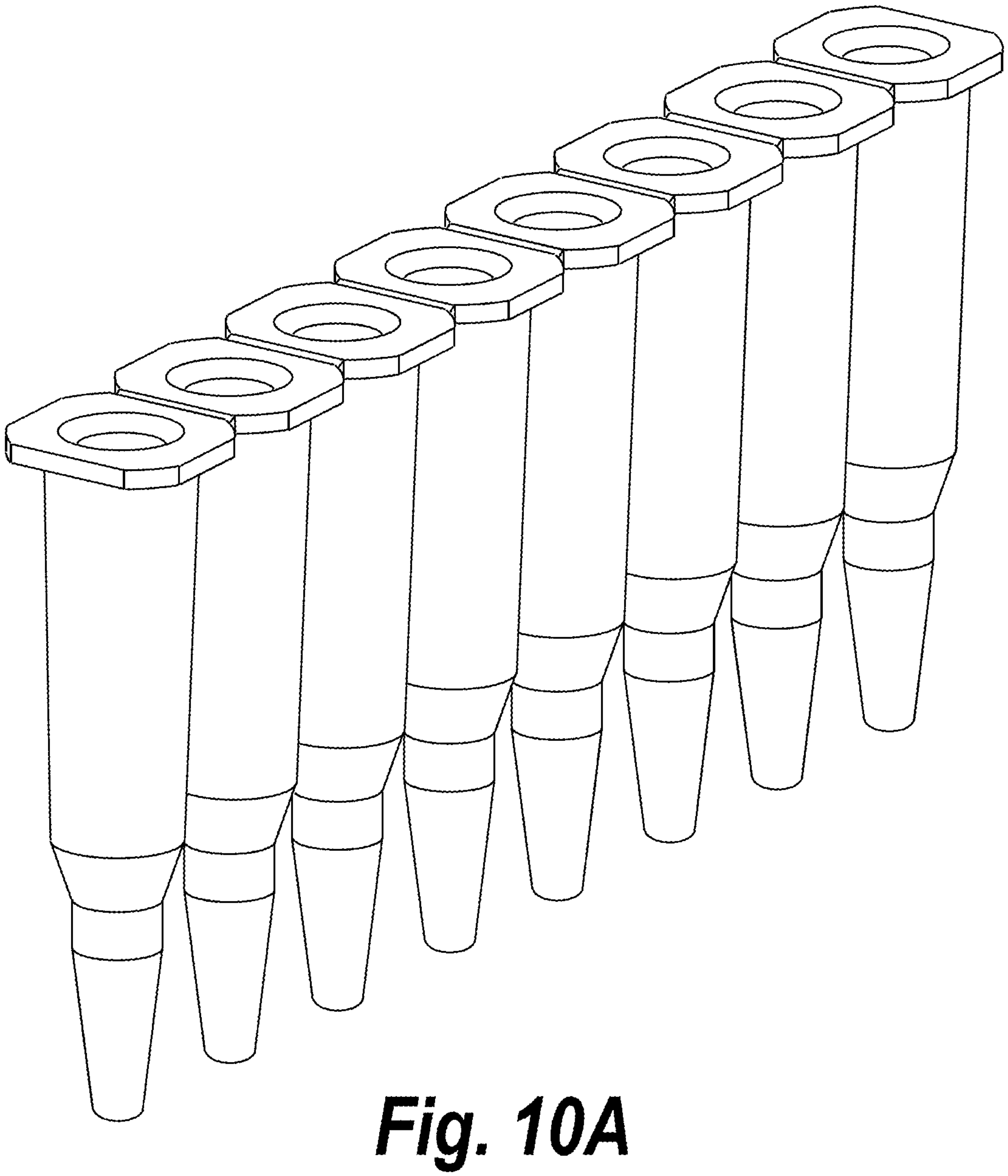
FIG. 10A illustrates a strip configuration including a plurality of connected individual preparation devices in accordance with the present technology.
Figure 10B:
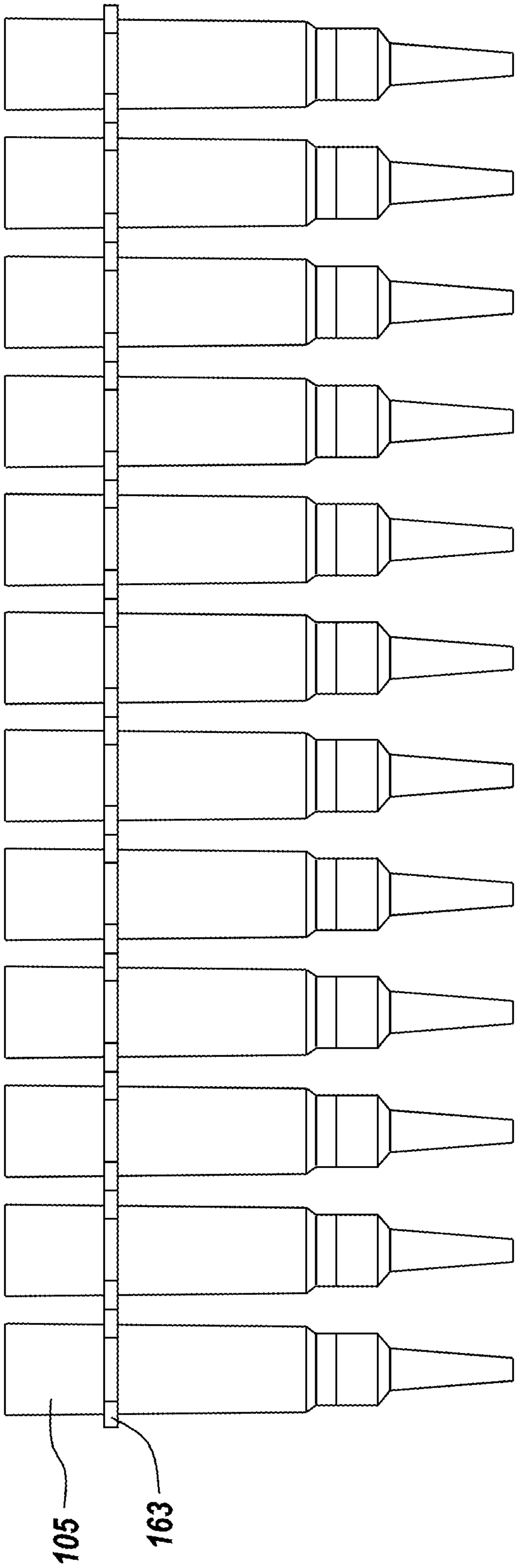
FIG. 10B shows a front view of a strip configuration including 12 connected devices in accordance with the present technology.
Figure 10C:
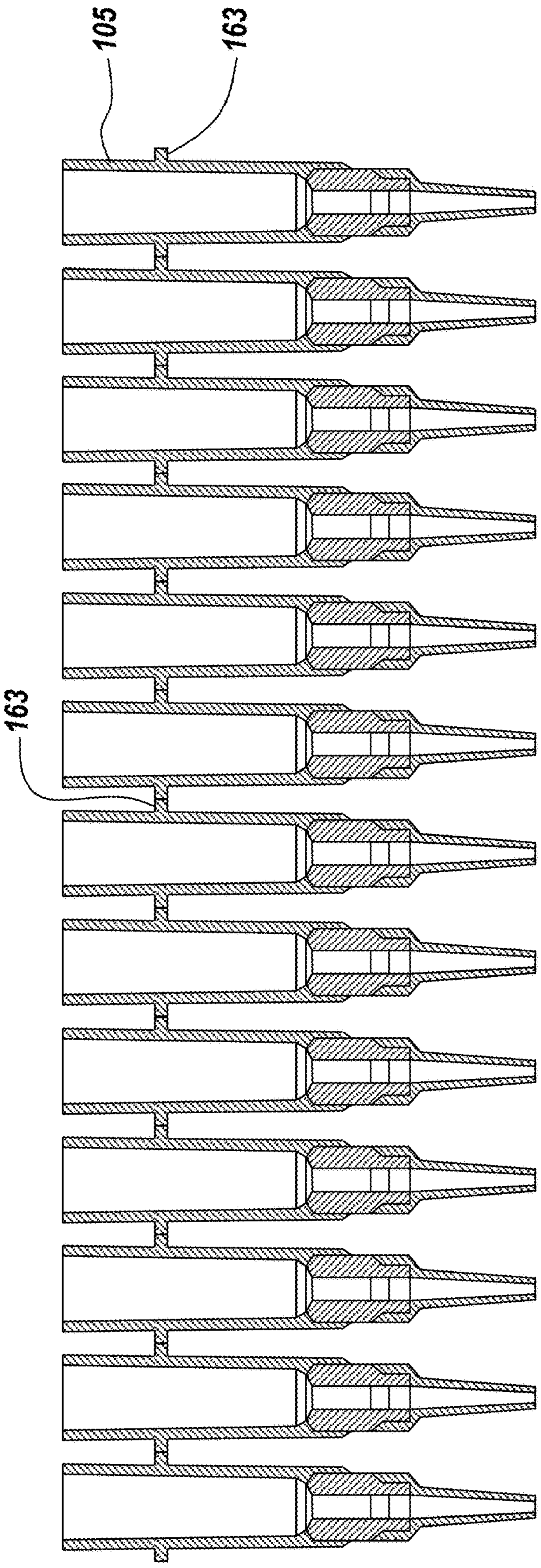
FIG. 10C shows a cross-sectional view of the strip of FIG. 10B.
Figure 10D:
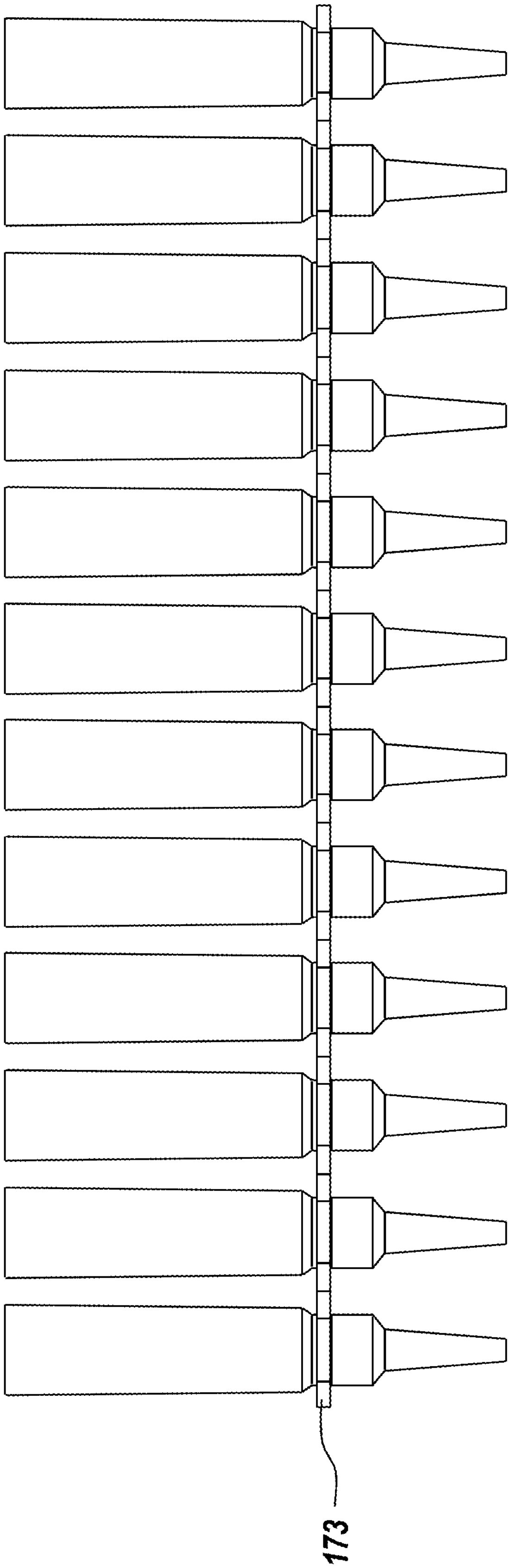
FIG. 10D shows a front view of another embodiment of a strip configuration including 12 connected devices.
Figure 10E:
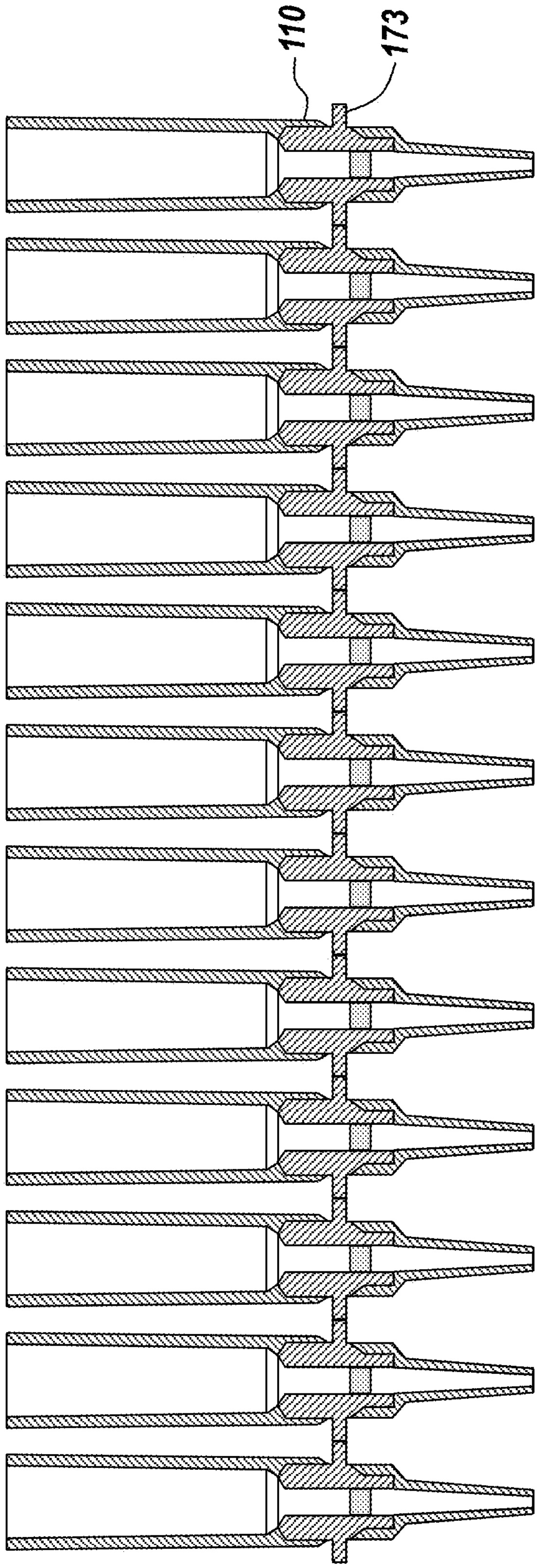
FIG. 10E shows a cross-sectional view of the strip of FIG. 10D.
Figure 10F:
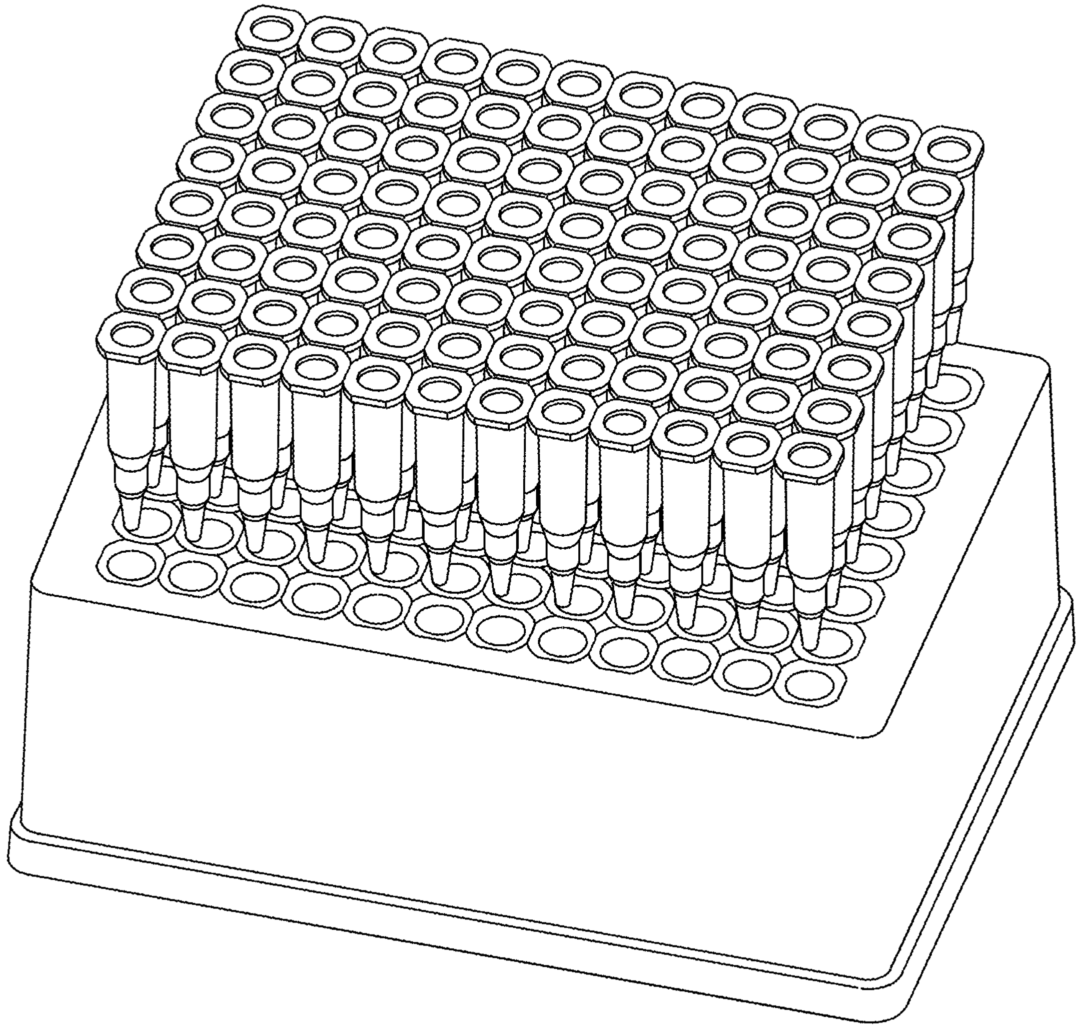
FIG. 10F shows a 96-well plate format for use with a plurality of individual preparation devices in accordance with the present technology.
Figure 10G:
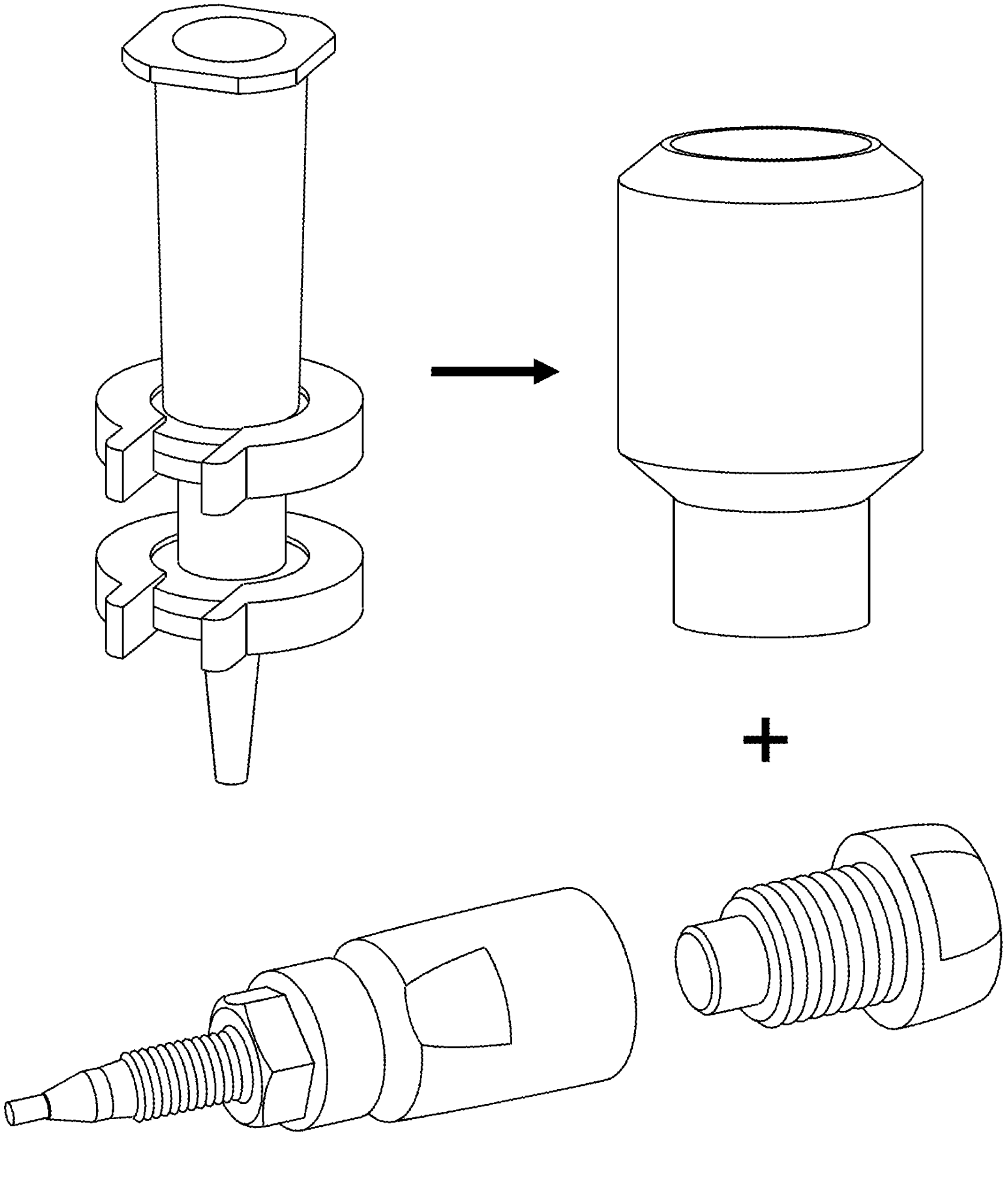
FIG. 10G illustrates a direct connection between a preparation device made in accordance with the present technology directly connected to a liquid chromatography system.

The present technology is available as a single device for use with a single-channel pipette (such as device 100 shown in FIG. 1A) or in other formats, such as, for example, a strip of 8 (such as the device shown in FIG. 3A) or even 12, or more, or in a rack or grid format (e.g., 48, 96, 384 devices) for multi-channel usage. Furthermore, devices in accordance with the present technology can be arranged in a 96-well plate format for use with a vacuum manifold, positive pressure manifold, or a 96-tip head on an automatic liquid handler. From the strip of 8 or 12 or more format, devices can be snapped apart to a quantity the user desires through perforation, slots, or weakened union. This allows for flexible handheld pipette loading into an array or onto an auto sampler. Referring to FIG. 10A, shown is an embodiment in an eight-unit strip format. The strip need not contain 8 devices. That is, the strip can include any number or plurality of devices (2, 3, 4, 5, 6, 7, 8, 9, 10, 11, 12, 13, 14, 15, etc.) and adjacent devices can be either permanently or detachably connected. For example, FIG. 10B and FIG. 10C illustrates an embodiment which includes 12 devices that are connected together at a location 163 along the length (i.e., not at the inlet) of the reservoir portion. In the embodiment shown in front view in FIG. 10D and in cross-sectional view in FIG. 10E, 12 devices are connected together in a strip format. To create the connection between individual devices, the body portion 110 includes a connector 173, which can include perforations or weaken locations to allow adjacent devices to be detached from the strip. Non-linear formats of connected devices are also possible. FIG. 10F illustrates a format in which a 96 well plate is used. Other size plates are possible, for example a 384 or 1536 well plate. FIG. 10G illustrates yet another format. In the embodiment shown in FIG. 10G, the format has been adapted for direct connection to a liquid chromatography system for on-line or at-line usage.

The present technology also includes embodiments that feature the connection of two customizable parts. That is, instead of joining and creating a liquid-tight connection between three parts, in some embodiments, the present technology features a bespoke preparation device formed from two customized parts. Uses may include, but are not limited to, direct connection to LC systems.

Figure 11A:
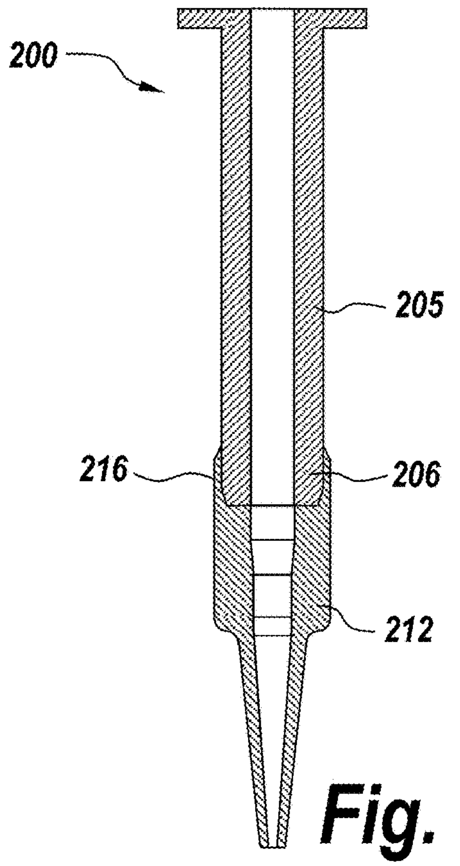
FIGS. 11A-11D illustrate cross-sectional views of a two-part preparation device in accordance with the present technology.
Figure 11B:
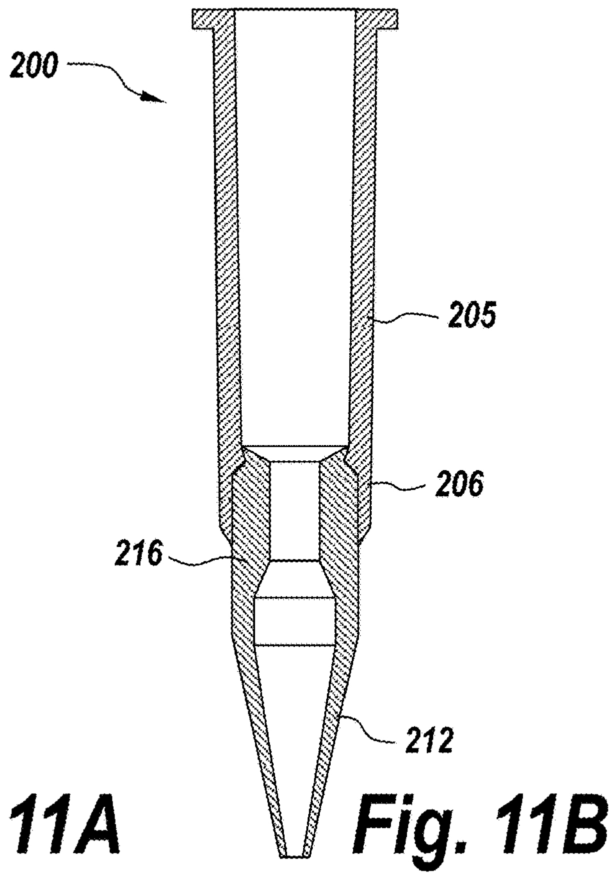
Figure 11C:
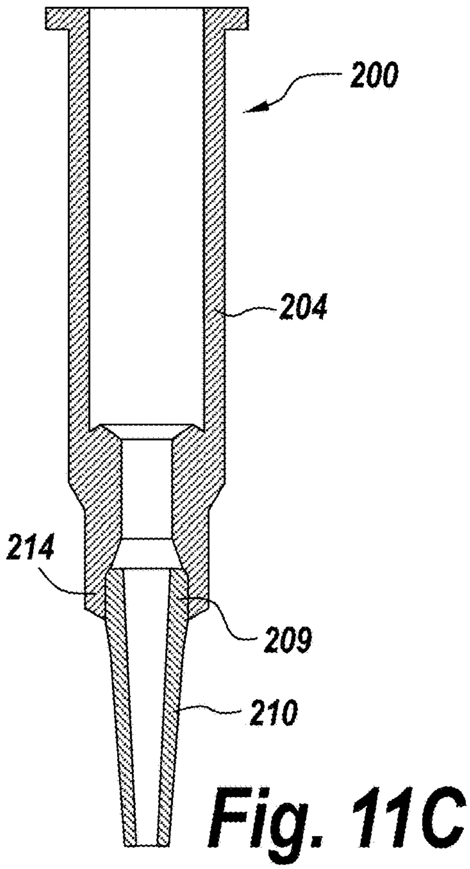
Figure 11D:
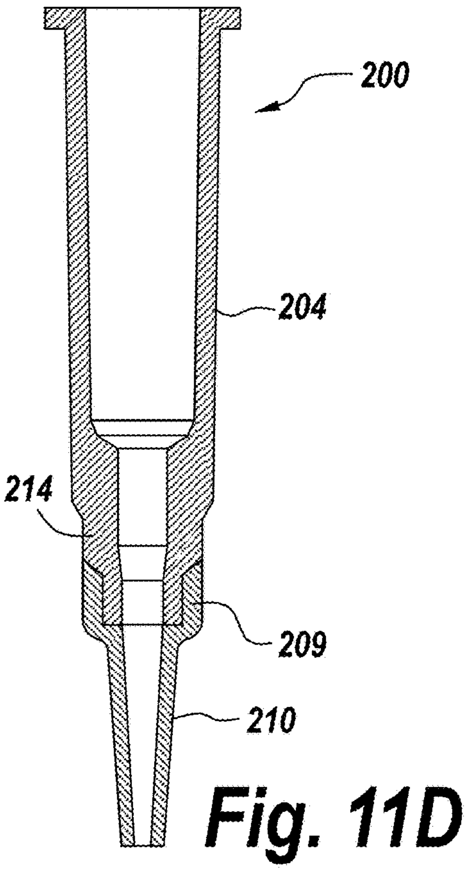

In general, two-part embodiments feature either a combined reservoir/body unitary segment or alternatively, a combined body/tip unitary segment. For example, referring to FIGS. 11A-11D, shown are four possible two-part embodiments. Other two-part embodiments are also within the scope of the present technology. In FIG. 11A, two-part device 200 includes a customized reservoir portion 205 connected to a unitary body/tip portion 212. As shown in FIG. 11A, an end 206 of the reservoir portion 205 is sealed within a top portion 216 of the unitary body/tip portion 212. The two-part device 200 shown in FIG. 11B, also includes a unitary body/tip portion 212, however, in this embodiment, end 206 of the reservoir portion accepts and seals within portion 216 of unitary body/tip portion 212. FIGS. 11C and 11D show embodiments including a unitary reservoir/body portion 204. In FIG. 11C, unitary reservoir/body portion 204 has an end 214 that surrounds and seals inlet 209 to tip portion 210. FIG. 11D illustrates an embodiment of device 200 in which tip portion 210 is positioned on unitary reservoir/body 204, such that inlet 209 surrounds end 214 to create the fluid-tight seal. Any and all combinations of features and embodiments described above in connection with three or more part/segment devices can be implemented or used with bespoke two-part devices 200. For example, while all embodiments shown in FIGS. 11A-D use cylindrically shaped reservoir or unitary reservoir/body portions, other shapes are possible, such as shapes similar to the curved shape shown in FIG. 2H or the rounded shape shown in FIG. 2D. In some embodiments, coatings can be utilized. And certain embodiments feature the use of any of the above joining or sealing techniques (e.g., adhesive, melting, clamps, etc.). Further the two-part devices can be made in any form factor, such as single device, a strip of 4, 8, 12 or more detachable or permanently linked devices, plates, wells or grids of any desired number of devices.

Affinity capture is one of the most powerful techniques for facilitating protein purification, biotherapeutic characterization and pre-clinical diagnostics. However, problems like tedious sample preparation steps, insufficient selectivity and recovery of targets, poor reproducibility and unoptimized compatibility with downstream processing still plague assay dependent on affinity capture technology. Accordingly, the present technology provides a sample processing device that operates with both automation and manual platforms to offer high recovery, fast and simple operation, and straightforward integration with downstream analysis techniques.

In one embodiment directed to Protein A affinity capture, a monodisperse polymethacrylate based resin is used. This resin provides high resolution results when stored under wet or dry conditions. To overcome usability issues, this affinity prototype was designed to enable effective sample binding within 5 pipette-facilitated aspirations, which is a great improvement over conventional devices which require up to 250 cycles and use an automated liquid handler. Additionally, by allowing a user to select a reservoir portion with a large volume (e.g., 10 to 300 microliters), the user can aspirate and dispense a range of volumes directly from one device for end-to-end sample preparation within a single device. This improves user experience by providing the opportunity to further customize their procedure for desired transfer volumes, and maximum recovery and cleanliness.

As used herein, the term “about” means that the numerical value is approximate and small variations would not significantly affect the practice of the disclosed embodiments. Where a numerical limitation is used, unless indicated otherwise by context, “about” means the numerical value can vary by ±10% and remain within the scope of the disclosed embodiments.

Alternatives

Figure 12:
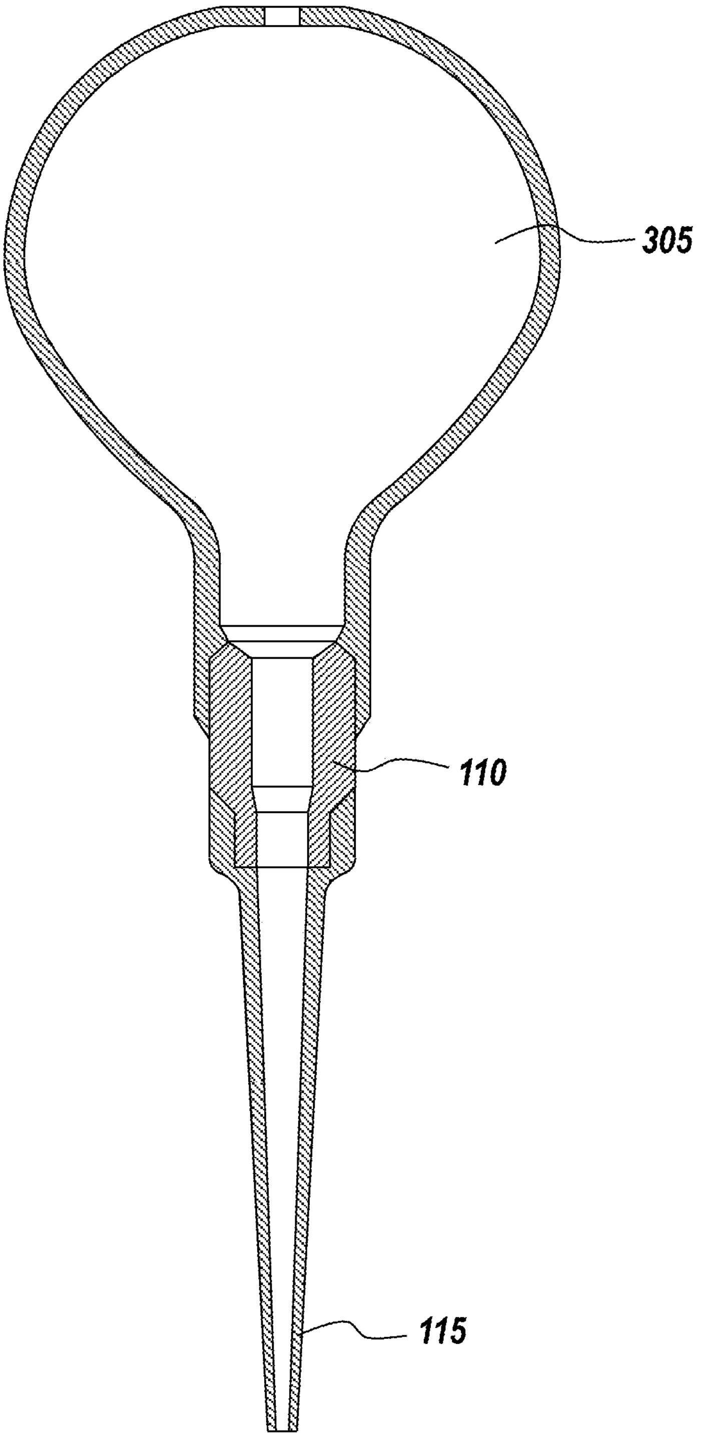
FIG. 12 is a cross-sectional view illustrating an embodiment of the sample preparation device of the present technology featuring a deformable reservoir portion.
Figure 13A:
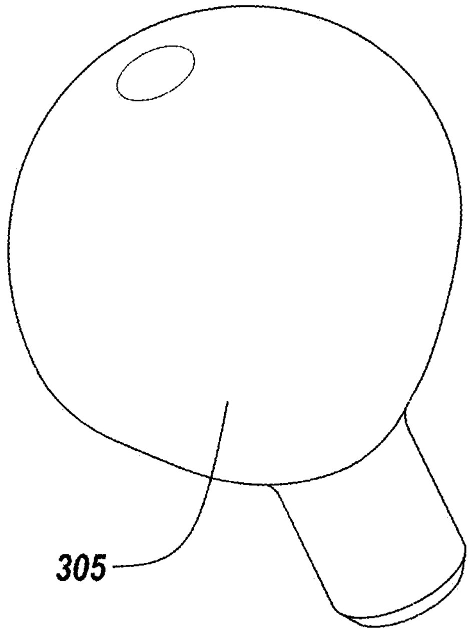
FIG. 13A is a perspective view of the deformable reservoir portion of FIG. 12.
Figure 13B:
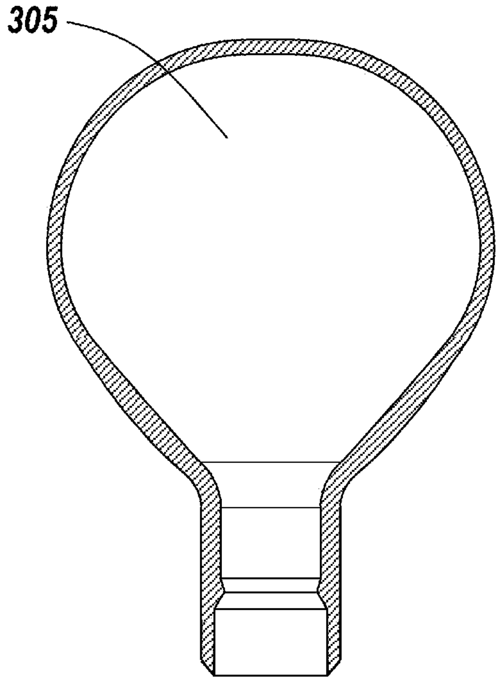
FIG. 13B is a cross-sectional view of the deformable reservoir portion of FIG. 13A.
Figure 13C:
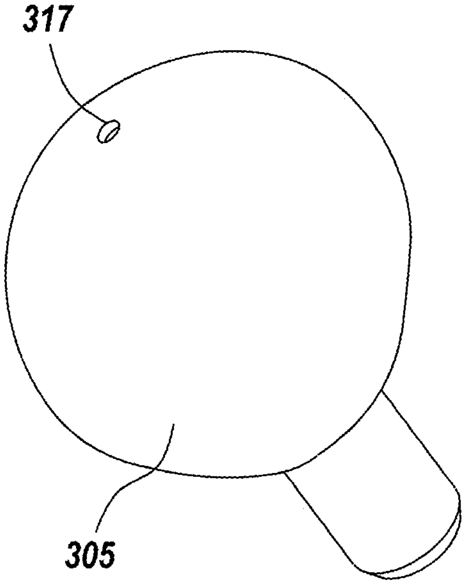
FIG. 13C is a perspective view of another embodiment of the deformable reservoir portion.
Figure 13D:
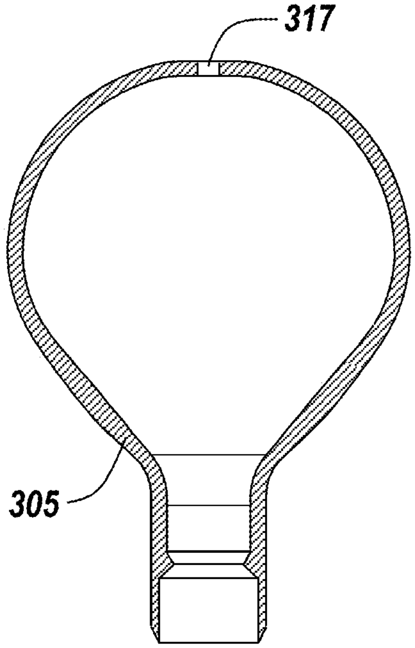
FIG. 13D is a cross-sectional view of the deformable reservoir portion of FIG. 13C.
Figure 13E:
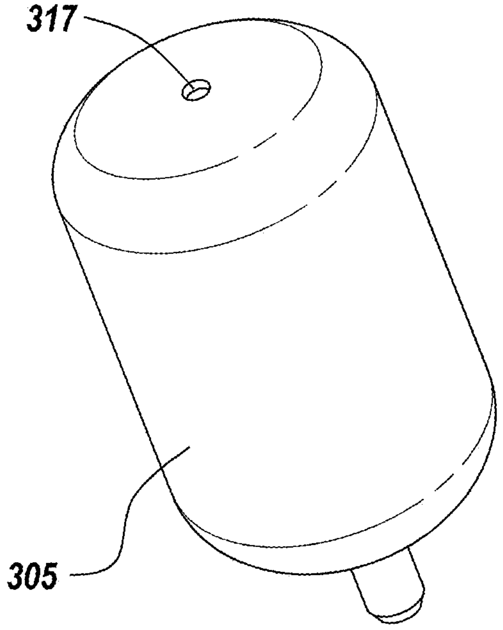
FIG. 13E is a perspective view of another embodiment of the deformable reservoir portion.
Figure 13F:
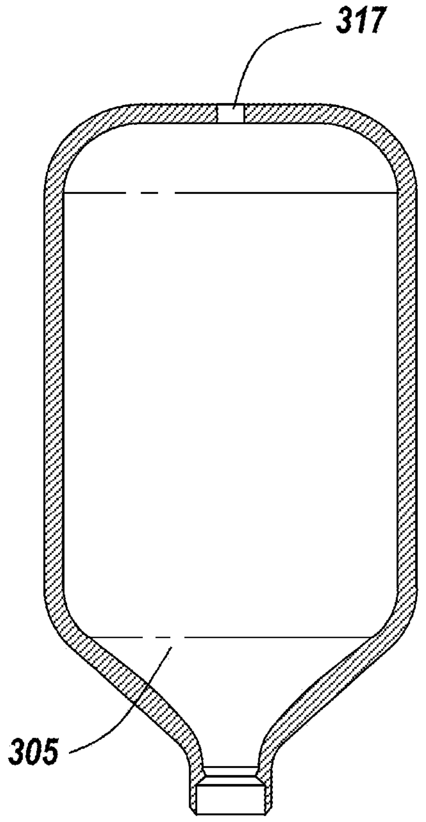
FIG. 13F is a cross-sectional view of the deformable reservoir portion of FIG. 13E.

Those of ordinary skill in the art will recognize that other embodiments are possible. For example, even though certain embodiments, such as the embodiment disclosed in FIGS. 2A-2H describe a reservoir portion that connects to a manual or automated platform at a top or inlet end, other embodiments are possible. One such embodiment utilizes a deformable reservoir portion. Referring to FIGS. 12 and 13A-F, shown are embodiments using deformable reservoirs 305. The deformable reservoir 305 is filled or holds the sample and any solvent for delivery to the body portion 110 and ultimately to the tip portion 115. The deformable reservoir 305 is preferable when working with large volumes of sample (e.g., 0.5 mL to 50 mL or more) and when lab-ware such as pipettes and liquid handlers are unavailable or impractical. The deformable reservoir can be disposable and can be replaceable. In some embodiments, the sample may be preloaded into the deformable reservoir for shipping with covers or lids. In other embodiments the sample can be loaded into the deformable reservoir 305 by the user. While FIG. 12 and FIGS. 13A and 13B illustrate the deformable reservoir portion 305 as a bulb, other form factors are possible. For example, the deformable reservoir portion 305 shown in FIGS. 13C and 13D is similar to that of FIGS. 13A and 13B (i.e., bulb holding 1 mL of internal volume, however the deformable reservoir portion of FIGS. 13C and 13D further include opening 317 at the top. Opening 317 can be used for injection of sample into the interior of the deformable reservoir 305. In some embodiment opening 317 can serve to expel gaseous substances from the interior of portion 305 when in a deformation state. FIGS. 13E and 13F illustrate yet another embodiment of a deformable reservoir portion 305. In this embodiment, the deformable reservoir portion has a cylindrical shape and has an internal volume that is about 10 times that of the embodiments shown in FIGS. 13A-D (e.g., reservoir in FIG. 13A-13D holds about 1 mL, whereas reservoir in FIGS. 13E and 13F holds up to about 10 mL). Other embodiments are also possible.

Those skilled in the art will recognize, or be able to ascertain using no more than routine experimentation, numerous equivalents to the specific procedures described herein. Such equivalents were considered to be within the scope of this technology and are covered by the following claims. The contents or all references, issued patents, and published patent applications cited throughout this application are hereby incorporated by reference.

What is claimed is:

1. A method of producing a liquid sample preparation device, the method comprising:

selecting a modular reservoir portion based on a desired liquid manipulator interface design, the modular reservoir portion having a first end having a liquid manipulator interface portion and a second end opposing the first end;

selecting a modular body portion based on a desired sample preparation receptacle characteristic, wherein the modular body portion comprises a resin disposed within the modular body;

selecting a modular tip portion based on desired outlet droplet shape or to minimize internal surface area, the tip portion having an inlet and an outlet at an end opposing the inlet; and fluidly connecting the second end of the modular reservoir portion to a first end of the modular body portion and fluidly connecting a second end of the modular body portion to the inlet of the modular tip portion to create a flow path.

2. A liquid sample processing device formed from three or more modular segments, the liquid sample preparation device comprising:

a modular body portion with a first end having a first connection interface and a second end having a second connection interface, wherein the modular body portion comprises a resin disposed within the modular body;

a modular reservoir portion fluidly connected to the first end of the modular body portion; and a modular tapered tip portion fluidly connectable to the second end of the body portion;

wherein the modular reservoir portion and the modular tip portion are removable from the modular body portion.

3. The liquid sample processing device of claim 2, wherein the modular tip portion is removed, resulting in a device with two modular segments.

4. The liquid sample processing device of claim 2, wherein the modular tip portion is removed and replaced with a different modular tip portion, or alternatively, cleaned and reconnected to the second end of the body portion to create a fluid tight connection.

5. The liquid sample processing device of claim 2, wherein an inlet to the modular reservoir portion is configured to interface with a manual liquid handling device.

6. The liquid sample processing device of claim 2, wherein an inlet to the modular reservoir portion is configured to interface with an automated liquid handling device.

7. The liquid sample processing device of claim 2, wherein an inlet to the modular reservoir portion is configured to interface with a vacuum manifold type liquid handing device.

* * * * *